United States Patent
Kuzuyama

(10) Patent No.: US 10,550,794 B2
(45) Date of Patent: Feb. 4, 2020

(54) CONTROL DEVICE FOR INTERNAL COMBUSTION ENGINE

(71) Applicants: TOYOTA JIDOSHA KABUSHIKI KAISHA, Toyota-shi, Aichi-ken (JP); KABUSHIKI KAISHA TOYOTA JIDOSHOKKI, Kariya-shi, Aichi-ken (JP)

(72) Inventor: Hiroshi Kuzuyama, Kariya (JP)

(73) Assignees: Toyota Jidosha Kabushiki Kaisha, Toyota-shi, Aichi-ken (JP); Kabushiki Kaisha Toyota Jidoshokki, Kariya-shi, Aichi-ken (JP)

( * ) Notice: Subject to any disclaimer, the term of this patent is extended or adjusted under 35 U.S.C. 154(b) by 62 days.

(21) Appl. No.: 15/994,742

(22) Filed: May 31, 2018

(65) Prior Publication Data
US 2018/0347503 A1 Dec. 6, 2018

(30) Foreign Application Priority Data

Jun. 2, 2017 (JP) .................................. 2017-110380

(51) Int. Cl.
*F02D 41/40* (2006.01)
*F02D 41/00* (2006.01)
*F02D 41/38* (2006.01)

(52) U.S. Cl.
CPC ......... *F02D 41/403* (2013.01); *F02D 41/009* (2013.01); *F02D 41/0077* (2013.01);
(Continued)

(58) Field of Classification Search
CPC .... F02D 41/403; F02D 41/401; F02D 41/402; F02D 41/0077; F02D 41/405
See application file for complete search history.

(56) References Cited

U.S. PATENT DOCUMENTS

| 2012/0000197 A1* | 1/2012 | Maruyama .......... F02D 41/0057 60/605.2 |
| 2013/0340720 A1 | 12/2013 | Kuzuyama et al. |
| 2015/0090217 A1 | 4/2015 | Kuzuyama et al. |

FOREIGN PATENT DOCUMENTS

| JP | 2012-031844 A | 2/2012 |
| JP | 2012-189035 | 10/2012 |
| JP | 2015-68284 | 4/2015 |

OTHER PUBLICATIONS

U.S. Appl. No. 15/832,991, filed Dec. 6, 2017.
U.S. Appl. No. 15/845,149, filed Dec. 18, 2017.

\* cited by examiner

*Primary Examiner* — Jacob M Amick
(74) *Attorney, Agent, or Firm* — Finnegan, Henderson, Farabow, Garrett & Dunner, LLP

(57) ABSTRACT

A control device for an internal combustion engine includes an electronic control unit. The electronic control unit controls a fuel injection valve to inject at least primary fuel and secondary fuel in this order such that a pattern of a pressure increase rate in the combustion chamber includes a first peak and a second peak, controls an injection timing and an injection amount of each of the primary fuel and the secondary fuel such that a second peak value becomes higher than a first peak value, controls an intake device such that oxygen density is increased along with an increase in a load, and controls the injection timing and the injection amount of each of the primary fuel and the secondary fuel such that a peak difference acquired by subtracting the first peak value from the second peak value is increased as the load is increased.

14 Claims, 30 Drawing Sheets

(52) U.S. Cl.
CPC ...... *F02D 41/401* (2013.01); *F02D 2041/389* (2013.01); *F02D 2200/101* (2013.01); *F02D 2200/1002* (2013.01)

CONTROL DEVICE FOR INTERNAL COMBUSTION ENGINE

INCORPORATION BY REFERENCE

The disclosure of Japanese Patent Application No. 2017-110380 filed on Jun. 2, 2017 including the specification, drawings and abstract is incorporated herein by reference in its entirety.

BACKGROUND

1. Technical Field

The present disclosure relates to a control device for an internal combustion engine.

2. Description of Related Art

In the related art, a control device for an internal combustion engine is disclosed in Japanese Unexamined Patent Application Publication No. 2015-068284 (JP 2015-068284 A). The control device is configured to perform primary fuel injection and secondary fuel injection in this order such that a definite valley appears between the peak value of the pressure increase rate in a combustion chamber at the time of combustion of fuel injected into a cylinder (into the combustion chamber) by the primary fuel injection, and the peak value of the pressure increase rate in the combustion chamber at the time of combustion of fuel injected into the combustion chamber by the secondary fuel injection. According to JP 2015-068284 A, combustion noise can be further reduced.

SUMMARY

Such a control device for an internal combustion engine in the related art does not consider a change in intake state in a combustion chamber. Thus, when oxygen density in the combustion chamber deviates from the target density such as when the recirculation rate of exhaust gas deviates from a target recirculation rate, a problem arises in that combustion noise is changed.

The present disclosure provides a control device for an internal combustion engine, the control device suppressing a change in combustion noise when oxygen density in a combustion chamber deviates from target density.

An aspect of the present disclosure relates to a control device for an internal combustion engine. The internal combustion engine includes an engine main body, a fuel injection valve configured to inject fuel into a combustion chamber in the engine main body, and an intake device configured to change oxygen density in the combustion chamber. The control device includes an electronic control unit. The electronic control unit is configured to control the fuel injection valve to inject at least primary fuel and secondary fuel in this order and cause heat release twice in a stepwise manner in the combustion chamber such that a pattern of a pressure increase rate in the combustion chamber includes a first peak and a second peak occurring after the first peak. The electronic control unit is configured to control an injection timing and an injection amount of each of the primary fuel and the secondary fuel such that a second peak value that is a peak value of the pressure increase rate at the second peak becomes higher than a first peak value that is a peak value of the pressure increase rate at the first peak. The electronic control unit is configured to control the intake device such that the oxygen density in the combustion chamber is increased along with an increase in a load of the internal combustion engine. The electronic control unit is configured to control the injection timing and the injection amount of each of the primary fuel and the secondary fuel such that a peak difference that is acquired by subtracting the first peak value from the second peak value is increased as the load of the internal combustion engine is increased.

In the control device according to the aspect of the present disclosure, the electronic control unit may be configured to control the injection amount of the secondary fuel to become larger than the injection amount of the primary fuel. The electronic control unit may be configured to control the injection amount of each of the primary fuel and the secondary fuel such that an injection amount ratio that is acquired by dividing the injection amount of the secondary fuel by the injection amount of the primary fuel is increased as the load of the internal combustion engine is increased.

In the control device according to the aspect of the present disclosure, the electronic control unit may be configured to inject pre-fuel before the injection of the primary fuel. The electronic control unit may be configured to control an injection amount of the pre-fuel to be increased such that a crank interval from a crank angle at which the pattern of the pressure increase rate in the combustion chamber has the first peak value, to a crank angle at which the pattern of the pressure increase rate in the combustion chamber has the second peak value is increased as a rotational speed of the internal combustion engine is increased.

In the control device according to the aspect of the present disclosure, the electronic control unit may be configured to control the injection timing of the secondary fuel to be retarded and control the injection amount of the secondary fuel to be increased such that a crank interval from a crank angle at which the pattern of the pressure increase rate in the combustion chamber has the first peak value, to a crank angle at which the pattern of the pressure increase rate in the combustion chamber has the second peak value is increased as a rotational speed of the internal combustion engine is increased.

In the control device according to the aspect of the present disclosure, the intake device may be configured to recirculate exhaust gas emitted from the combustion chamber to an intake passage in the engine main body and change a recirculation rate of the exhaust gas. The electronic control unit may be configured to control the intake device such that the recirculation rate of the exhaust gas is decreased as the load of the internal combustion engine is increased. The electronic control unit may be configured to correct the injection amount of each of the primary fuel and the secondary fuel based on a first difference value that is acquired by subtracting an actual recirculation rate of the exhaust gas from a target recirculation rate of the exhaust gas after a change in load, when the load of the internal combustion engine is changed to a low load side from a high load side.

In the control device according to the aspect of the present disclosure, the electronic control unit may be configured to correct the injection amount of the primary fuel such that the injection amount of the primary fuel is decreased, and correct the injection amount of the secondary fuel such that the injection amount of the secondary fuel is increased as the first difference value is increased.

In the control device according to the aspect of the present disclosure, the intake device may be configured to recirculate exhaust gas emitted from the combustion chamber to an intake passage in the engine main body and change a recirculation rate of the exhaust gas. The electronic control unit may be configured to control the intake device such that the recirculation rate of the exhaust gas is decreased as the load of the internal combustion engine is increased. The electronic control unit may be configured to correct the injection timing of the primary fuel based on a first difference value that is acquired by subtracting an actual recirculation rate of the exhaust gas from a target recirculation rate of the exhaust gas after a change in load, when the load of the internal combustion engine is changed to a low load side from a high load side.

In the control device according to the aspect of the present disclosure, the electronic control unit may be configured to retard the injection timing of the primary fuel as the first difference value is increased.

In the control device according to the aspect of the present disclosure, the electronic control unit may be configured to inject pre-fuel before the injection of the primary fuel and retard an injection timing of the pre-fuel as the first difference value is increased.

In the control device according to the aspect of the present disclosure, the electronic control unit may be configured to correct the injection amount of each of the primary fuel and the secondary fuel based on a second difference value that is acquired by subtracting the target recirculation rate of the exhaust gas after a change in load from the actual recirculation rate of the exhaust gas, when the load of the internal combustion engine is changed to a high load side from a low load side.

In the control device according to the aspect of the present disclosure, the electronic control unit may be configured to, as the second difference value is increased, correct the injection amount of the primary fuel to increase the injection amount of the primary fuel, and correct the injection amount of the secondary fuel to decrease the injection amount of the secondary fuel.

In the control device according to the aspect of the present disclosure, the electronic control unit may be configured to correct the injection timing of the primary fuel based on a second difference value that is acquired by subtracting the target recirculation rate of the exhaust gas after a change in load from the actual recirculation rate of the exhaust gas, when the load of the internal combustion engine is changed to a high load side from a low load side.

In the control device according to the aspect of the present disclosure, the electronic control unit may be configured to advance the injection timing of the primary fuel as the second difference value is increased.

In the control device according to the aspect of the present disclosure, the electronic control unit may be configured to inject pre-fuel before the injection of the primary fuel and advance an injection timing of the pre-fuel as the second difference value is increased.

According to the aspect of the present disclosure, a change in combustion noise can be further suppressed even when the oxygen density in the combustion chamber deviates from target density.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, each embodiment of the present disclosure will be described in detail with reference to the drawings. In the following description, corresponding constituents will be designated with the same reference signs.

First Embodiment

Figure 1:
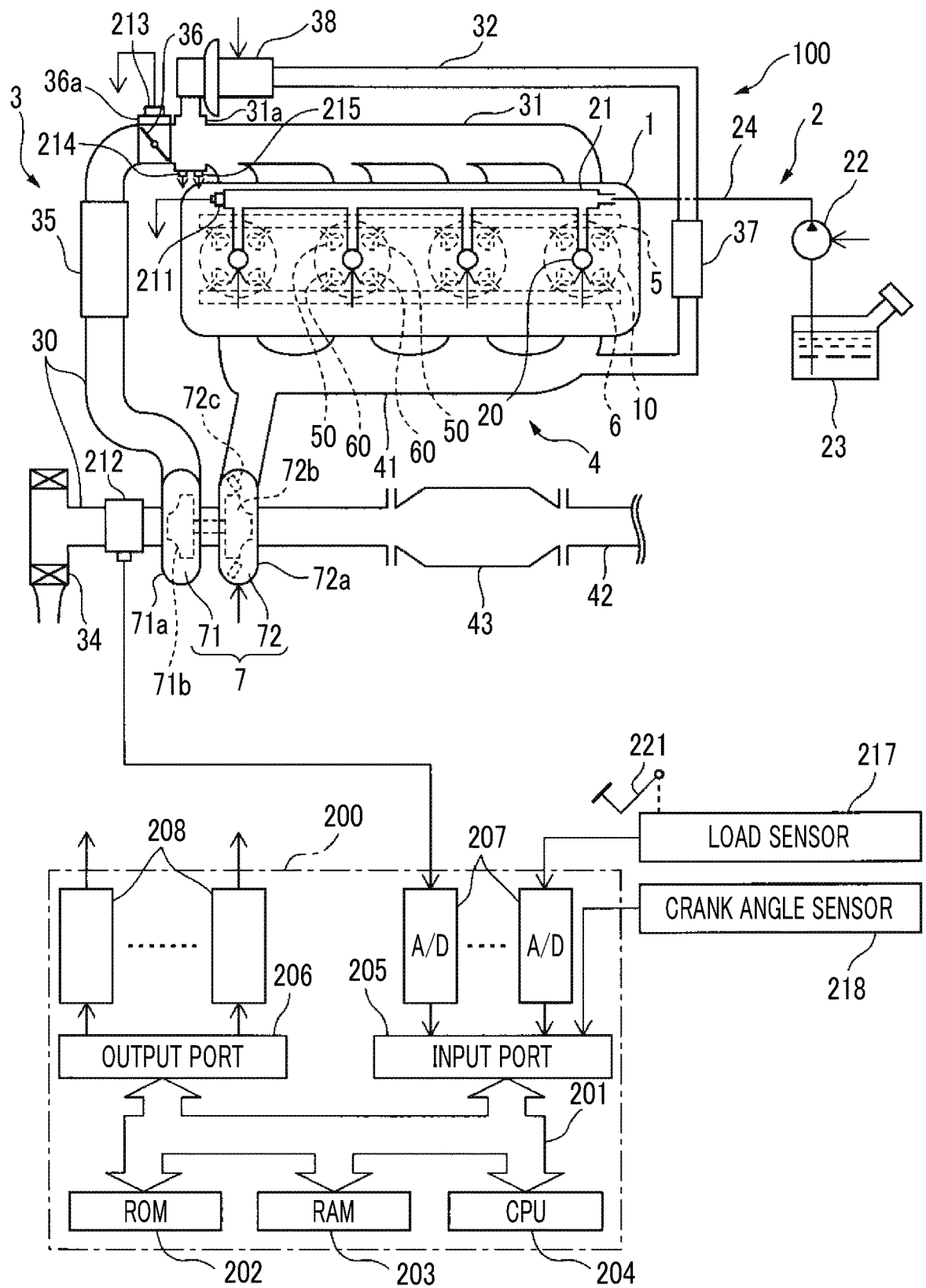
FIG. 1 is a schematic configuration diagram of an internal combustion engine and an electronic control unit controlling the internal combustion engine according to a first embodiment of the present disclosure.
Figure 2:
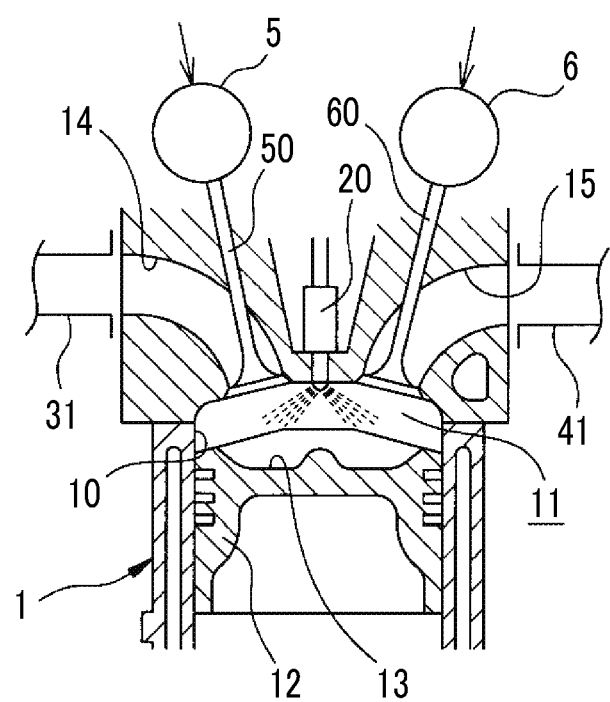
FIG. 2 is a sectional view of an engine main body of the internal combustion engine.

FIG. 1 is a schematic configuration diagram of an internal combustion engine 100 and an electronic control unit 200 controlling the internal combustion engine 100 according to a first embodiment of the present disclosure. FIG. 2 is a sectional view of an engine main body 1 of the internal combustion engine 100.

As illustrated in FIG. 1, the internal combustion engine 100 includes the engine main body 1, a fuel supply device 2, an intake device 3, an exhaust device 4, an intake valve operating device 5, and an exhaust valve operating device 6. The engine main body 1 includes a plurality of cylinders 10.

The engine main body 1 causes fuel to be combusted in a combustion chamber 11 (refer to FIG. 2) formed in each cylinder 10 to generate power for driving a vehicle or the like. A pair of intake valves 50 and a pair of exhaust valves 60 are disposed per cylinder in the engine main body 1.

The fuel supply device 2 includes an electronic control fuel injection valve 20, a delivery pipe 21, a supply pump 22, a fuel tank 23, a pumping pipe 24, and a fuel pressure sensor 211.

One fuel injection valve 20 is disposed in each cylinder 10 to face the combustion chamber 11 in each cylinder 10 such that fuel can be directly injected into the combustion chamber 11. The opening time period (injection amount) and the opening timing (injection timing) of the fuel injection valve 20 are changed by a control signal from the electronic control unit 200. When the fuel injection valve 20 is opened, fuel is directly injected into the combustion chamber 11 from the fuel injection valve 20.

The delivery pipe 21 is connected to the fuel tank 23 through the pumping pipe 24. The supply pump 22 for pressurizing fuel stored in the fuel tank 23 to supply the fuel to the delivery pipe 21 is disposed in the middle of the pumping pipe 24. The delivery pipe 21 temporarily stores high-pressure fuel that is pumped from the supply pump 22. When the fuel injection valve 20 is opened, the high-pressure fuel stored in the delivery pipe 21 is directly injected into the combustion chamber 11 from the fuel injection valve 20.

The supply pump 22 is configured to change a discharge amount. The discharge amount of the supply pump 22 is changed by a control signal from the electronic control unit 200. The pressure of fuel in the delivery pipe 21, that is, the injection pressure of the fuel injection valve 20, is controlled by controlling the discharge amount of the supply pump 22.

The fuel pressure sensor 211 is disposed in the delivery pipe 21. The fuel pressure sensor 211 detects the pressure of fuel in the delivery pipe 21, that is, the pressure of fuel injected into each cylinder 10 from each fuel injection valve 20 (injection pressure).

The intake device 3 is a device for guiding intake air into the combustion chamber 11, and is configured to change the state of intake air (intake pressure (boost pressure), intake temperature, and exhaust gas recirculation (EGR) gas amount) taken into the combustion chamber 11. That is, the intake device 3 is configured to change oxygen density in the combustion chamber 11. The intake device 3 includes an intake pipe 30 and an intake manifold 31 as an intake passage, and an EGR passage 32.

A first end of the intake pipe 30 is connected to an air cleaner 34. A second end of the intake pipe 30 is connected to an intake collector 31a of the intake manifold 31. An air flow meter 212, a compressor 71 of an exhaust turbocharger 7, an intercooler 35, and a throttle valve 36 are disposed in the intake pipe 30 in this order from upstream.

The air flow meter 212 detects the flow rate of air that is finally taken into each cylinder 10 by flowing through the intake pipe 30.

The compressor 71 includes a compressor housing 71a and a compressor wheel 71b that is disposed in the compressor housing 71a. The compressor wheel 71b is rotationally driven by a turbine wheel 72b of the exhaust turbocharger 7. The compressor wheel 71b and the turbine wheel 72b are coaxially disposed with each other. The compressor wheel 71b compresses intake air flowing into the compressor housing 71a and discharges the compressed intake air. A variable nozzle 72c for controlling the rotational speed of the turbine wheel 72b is disposed in a turbine 72 of the exhaust turbocharger 7. The pressure of intake air discharged from the compressor housing 71a (boost pressure) is controlled by controlling the rotational speed of the turbine wheel 72b using the variable nozzle 72c.

The intercooler 35 is a heat exchanger for cooling intake air that is compressed to have a high temperature by the compressor 71, using wind induced by traveling, coolant, or the like.

The throttle valve 36 adjusts the amount of intake air introduced into the intake manifold 31 by changing the cross-sectional area of the intake pipe 30. The throttle valve 36 is driven to be open or closed by a throttle actuator 36a. The opening degree (throttle opening degree) of the throttle valve 36 is detected by a throttle sensor 213.

The intake manifold 31 is connected to an intake port 14 that is formed in the engine main body 1. The intake manifold 31 evenly distributes intake air flowing from the intake pipe 30 to each cylinder 10 through the intake port 14. An intake pressure sensor 214 for detecting the pressure of intake air (intake pressure) taken into the combustion chamber, and an intake temperature sensor 215 for detecting the temperature of intake air (intake temperature) taken into the combustion chamber are disposed in the intake collector 31a of the intake manifold 31.

The EGR passage 32 is a passage for causing the exhaust manifold 41 to communicate with the intake collector 31a of the intake manifold 31 and causing a part of exhaust gas emitted from each cylinder 10 to return to the intake collector 31a using a difference in pressure. Hereinafter, exhaust gas that flows into the EGR passage 32 will be referred to as "EGR gas". The proportion of the amount of EGR gas in the amount of gas in the combustion chamber, that is, the recirculation rate of exhaust gas, will be referred to as "EGR rate". By recirculating the EGR gas to the intake collector 31a and further to each cylinder 10, the combustion temperature can be decreased, and the emission of nitrogen oxide (NOx) can be further suppressed. An EGR cooler 37 and an EGR valve 38 are disposed in the EGR passage 32 in this order from upstream.

The EGR cooler 37 is a heat exchanger for cooling the EGR gas using wind induced by traveling, coolant, or the like.

The EGR valve 38 is a solenoid valve of which the opening degree can be adjusted continuously or stepwise. The opening degree of the EGR valve 38 is controlled by the electronic control unit 200 depending on the operating state of the internal combustion engine. The flow rate of EGR gas recirculated to the intake collector 31a is adjusted by controlling the opening degree of the EGR valve 38. That is, the EGR rate can be controlled to be any value by controlling the opening degree of the EGR valve 38 to be an appropriate opening degree in accordance with the amount of intake air, the intake pressure (boost pressure), and the like.

The exhaust device 4 is a device for emitting exhaust gas from the combustion chamber, and includes an exhaust manifold 41 and an exhaust passage 42.

The exhaust manifold 41 is connected to an exhaust port 15 that is formed in the engine main body 1. The exhaust manifold 41 collects exhaust gas emitted from each cylinder 10 and introduces the collected exhaust gas into the exhaust passage 42.

The turbine 72 of the exhaust turbocharger 7, and an exhaust post-processing device 43 are disposed in the exhaust passage 42 in this order from upstream.

The turbine 72 includes a turbine housing 72a and the turbine wheel 72b that is disposed in the turbine housing 72a. The turbine wheel 72b is rotationally driven by the energy of exhaust gas flowing into the turbine housing 72a. The turbine wheel 72b drives the compressor wheel 71b that is coaxially disposed with the turbine wheel 72b.

The variable nozzle 72c is disposed outside the turbine wheel 72b. The variable nozzle 72c functions as a throttle valve. The nozzle opening degree (valve opening degree) of the variable nozzle 72c is controlled by the electronic control unit 200. The flow speed of exhaust gas that drives the turbine wheel 72b can be changed in the turbine housing 72a by changing the nozzle opening degree of the variable nozzle 72c. That is, by changing the nozzle opening degree of the variable nozzle 72c, the rotational speed of the turbine wheel 72b can be changed, and the boost pressure can be changed. Specifically, when the nozzle opening degree of the variable nozzle 72c is further decreased (the variable nozzle 72c is narrowed), the flow speed of exhaust gas is increased, and the rotational speed of the turbine wheel 72b is further increased. Thus, the boost pressure is further increased.

The exhaust post-processing device 43 is a device for controlling exhaust gas and emitting the controlled exhaust gas to the outer atmosphere. The exhaust post-processing device 43 includes various exhaust control catalysts for controlling hazardous substances, filters for trapping hazardous substances, and the like.

The intake valve operating device 5 is a device for driving the intake valves 50 in each cylinder 10 to be open or closed, and is disposed in the engine main body 1. The intake valve operating device 5 according to the first embodiment is configured to drive the intake valves 50 to be open or closed using, for example, an electromagnetic actuator such that the opening and closing timing of each intake valve 50 can be controlled. However, the present disclosure is not limited thereto. The intake valve operating device 5 may be configured to drive the intake valves 50 to be open or closed using an intake camshaft, and a variable valve operating mechanism that changes the relative phase angle of the intake camshaft with respect to a crankshaft using a hydraulic control may be disposed in one end portion of the intake camshaft such that the opening and closing timing of each intake valve 50 can be controlled.

The exhaust valve operating device 6 is a device for driving the exhaust valves 60 in each cylinder 10 to be open or closed, and is disposed in the engine main body 1. The exhaust valve operating device 6 according to the first embodiment is configured to drive the exhaust valves 60 to be open or closed using, for example, an electromagnetic actuator such that the opening and closing timing of each exhaust valve 60 can be controlled. However, the present disclosure is not limited thereto. The exhaust valve operating device 6 may be configured to drive the exhaust valves 60 to be open or closed using an exhaust camshaft, and a variable valve operating mechanism that changes the relative phase angle of the exhaust camshaft with respect to the crankshaft using a hydraulic control may be disposed in one end portion of the exhaust camshaft such that the opening and closing timing of each exhaust valve 60 can be controlled. In addition, the opening and closing timing or the lift amount of each exhaust valve 60 may be changed by changing the cam profile using hydraulic pressure or the like.

The electronic control unit 200 is configured with a digital computer and includes a read-only memory (ROM) 202, a random access memory (RAM) 203, a CPU (microprocessor) 204, an input port 205, and an output port 206 that are connected to each other through a bidirectional bus 201.

Output signals of the fuel pressure sensor 211 and the like are input into the input port 205 through each corresponding AD converter 207. The output voltage of a load sensor 217 that generates an output voltage proportional to the amount of force of stepping on an accelerator pedal 220 (hereinafter, referred to as "accelerator stepping force amount") is input into the input port 205 through the corresponding AD converter 207 as a signal for detecting the load of the internal combustion engine. The output signal of a crank angle sensor 218 that generates an output pulse each time the crankshaft in the engine main body 1 rotates by, for example, 15° is input into the input port 205 as a signal for calculating the rotational speed and the like of the internal combustion engine. Accordingly, the output signals of various sensors needed for controlling the internal combustion engine 100 are input into the input port 205.

The output port 206 is connected to each controlled component such as the fuel injection valve 20 through corresponding drive circuits 208.

The electronic control unit 200 outputs a control signal for controlling each controlled component from the output port 206 to control the internal combustion engine 100 based on the output signals of various sensors input into the input port 205. Hereinafter, the control of the internal combustion engine 100 performed by the electronic control unit 200 will be described.

The electronic control unit 200 operates the engine main body 1 by performing split injection in which fuel injection is performed a plurality of number of times at intervals.

Figure 3:
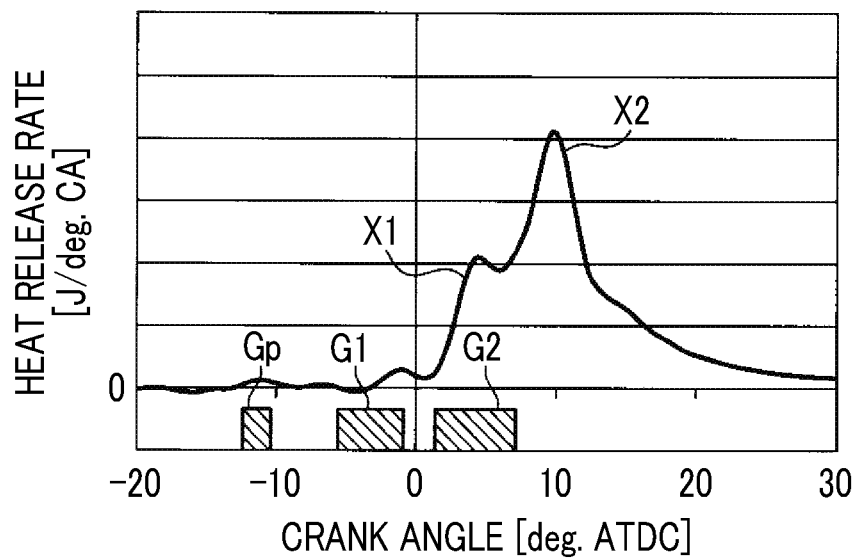
FIG. 3 is a graph illustrating a relationship between a crank angle and a heat release rate according to the first embodiment of the present disclosure.
Figure 4:
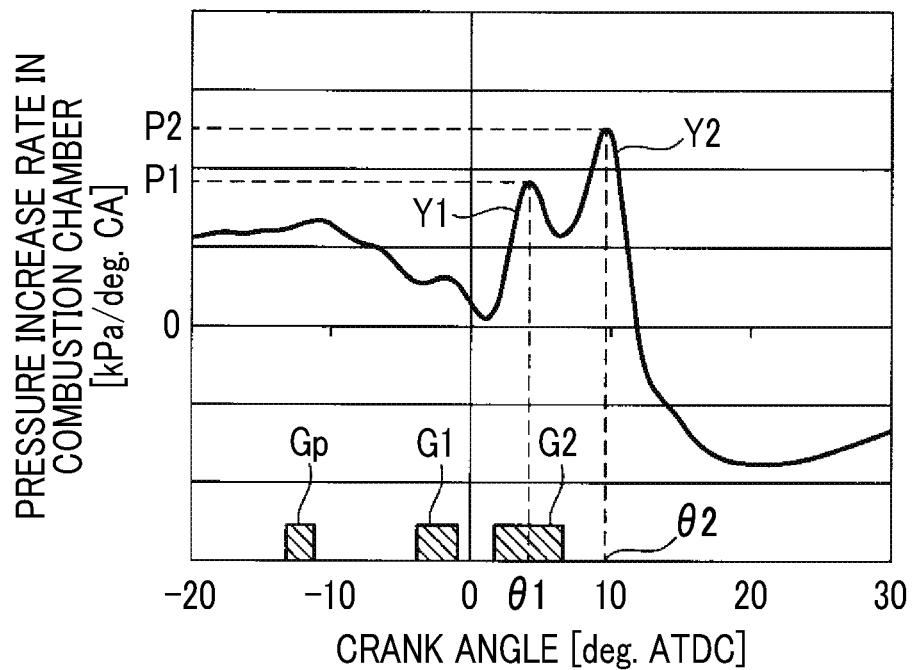
FIG. 4 is a graph illustrating a relationship between the crank angle and a pressure increase rate in a combustion chamber according to the first embodiment of the present disclosure.

FIG. 3 is a graph illustrating a relationship between the crank angle and the heat release rate when fuel is combusted by performing the split injection according to the first embodiment in a steady operation where the operating state of the internal combustion engine (the rotational speed of the internal combustion engine and the load of the internal combustion engine) is constant. FIG. 4 is a graph illustrating a relationship between the crank angle and the pressure increase rate in the combustion chamber in such a case.

A heat release rate (dQ/dθ) [J/deg. CA] is the heating value per unit crank angle when fuel is combusted, that is, a heat release amount Q per unit crank angle. In the following description, a combustion waveform that represents the relationship between the crank angle and the heat release rate will be referred to as "heat release rate pattern" when needed. A pressure increase rate (dP/dθ) [kPa/deg. CA] in the combustion chamber is the value of a derivative of a pressure P [kPa] in the combustion chamber with respect to the crank angle. In the following description, a pressure waveform that represents the relationship between the crank angle and the pressure increase rate in the combustion chamber will be referred to as "pattern of the pressure increase rate in the combustion chamber" when needed.

As illustrated in FIG. 3, the electronic control unit 200 operates the engine main body 1 by performing pre-fuel injection Gp, first main fuel injection G1, and second main fuel injection G2 in this order. The pre-fuel injection Gp is basically injection that causes pre-fuel to self-ignite at a crank angle advanced from that for first main fuel, thereby increasing the temperature to cause self-ignition of the first main fuel. Each of the first main fuel injection G1 and the second main fuel injection G2 is basically injection that is performed for outputting a requested torque corresponding to the load of the internal combustion engine.

In the first embodiment, the injection amount and the injection timing of each of the pre-fuel injection Gp, the first main fuel injection G1, and the second main fuel injection G2 are controlled such that the pre-fuel and the first main fuel are used for causing premix charged compressive ignition (PCCI) in which combustion occurs after a certain period for premixing with air after fuel injection, and that the second main fuel is used for causing diffusive combustion (DC) in which combustion basically occurs without any delay after fuel injection, thereby causing heat release twice in a stepwise manner in an expansion stroke (at the beginning of combustion, a part of the second main fuel may be used for causing the premix charged compressive ignition, and the entirety of the second main fuel does not have to be combusted in the diffusive combustion).

That is, as illustrated in FIG. 3, the injection amount and the injection timing of each of the pre-fuel injection Gp, the first main fuel injection G1, and the second main fuel injection G2 are controlled to form a first mountain combustion waveform X1 of the heat release rate pattern mainly caused by heat release at the combustion of the first main fuel, and then, form a second mountain combustion waveform X2 of the heat release rate pattern mainly caused by heat release at the combustion of the second main fuel. Thus, the shape of the heat release rate pattern has two mountains.

Accordingly, as illustrated in FIG. 4, a first mountain pressure waveform Y1 of the pattern of the pressure increase rate in the combustion chamber is mainly formed by heat release at the combustion of the first main fuel, and then, a second mountain pressure waveform Y2 of the pattern of the pressure increase rate in the combustion chamber is mainly formed by heat release at the combustion of the second main fuel. Thus, along with the heat release rate pattern, the shape of the pattern of the pressure increase rate in the combustion chamber also has two mountains.

Accordingly, by causing heat release twice in a stepwise manner at appropriate intervals, the phase of a pressure wave generated by the second heat release (in the first embodiment, a pressure wave that is mainly generated at the combustion of the second main fuel) can be set to deviate from the phase of a pressure wave generated by the first heat release (in the first embodiment, a pressure wave that is mainly generated at the combustion of the first main fuel). Thus, by appropriately setting the phases of the two pressure waves to deviate from each other, for example, by setting the second phase to be in antiphase with the first phase, it is possible to decrease the amplitude of the actual pressure wave into which the two pressure waves that cause combustion noise are combined. Consequently, combustion noise [dB] can be reduced.

In the first embodiment, as illustrated in FIG. 4, the injection amount of each of the pre-fuel injection Gp, the first main fuel injection G1, and the second main fuel injection G2 is controlled such that a peak value (hereinafter, referred to as "second peak value") P2 of the second mountain pressure waveform Y2 of the pattern of the pressure increase rate in the combustion chamber is higher than a peak value (hereinafter, referred to as "first peak value") P1 of the first mountain pressure waveform Y1. That is, in the first embodiment, the injection amount of each of the pre-fuel injection Gp, the first main fuel injection G1, and the second main fuel injection G2 is controlled such that a difference (hereinafter, referred to as "peak difference") ΔP (=P2−P1) between the second peak value P2 and the first peak value P1 securely falls within a predetermined range.

In addition, in the first embodiment, the injection amount of each of the pre-fuel injection Gp, the first main fuel injection G1, and the second main fuel injection G2 is controlled such that as the load of the internal combustion engine is increased, the peak difference ΔP is increased by increasing the second peak value P2. Hereinafter, the reason for such a control will be described.

Figure 5:
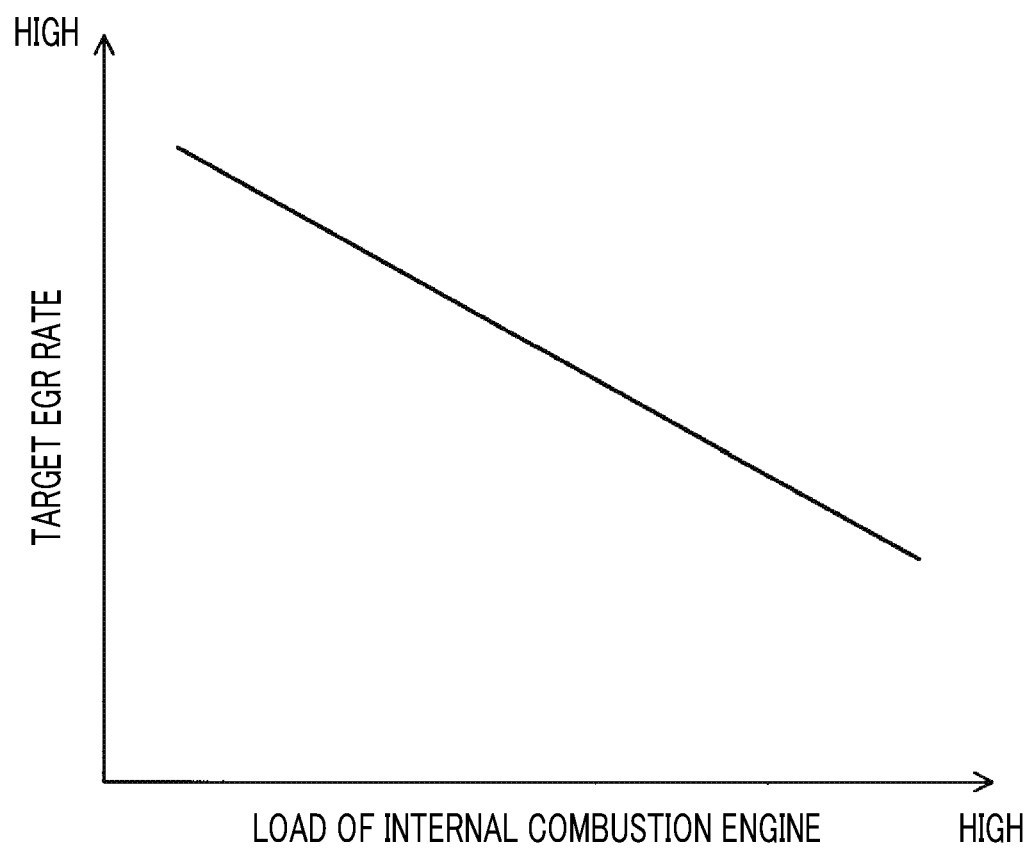
FIG. 5 is a graph for calculating a target EGR rate based on a load of the internal combustion engine.

The electronic control unit 200 according to the first embodiment controls the fuel supply device 2 as described above and controls the intake device 3 (the throttle valve 36, the variable nozzle 72c, the EGR valve 38, and the like) such that as the load of the internal combustion engine is increased, the oxygen density in the combustion chamber 11 is increased. In the first embodiment, in order to control exhaust emissions, that is, in order to reduce the amount of NOx or soot emissions, a target EGR rate is calculated based on the load of the internal combustion engine with reference to a graph in FIG. 5 that is produced in advance by experiment and the like, and the intake device 3 is controlled such that the EGR rate in actuality (hereinafter, referred to as "actual EGR rate") becomes equal to the target EGR rate. As illustrated in FIG. 5, as the load of the internal combustion engine is increased, the target EGR rate is decreased (in other words, as the load of the internal combustion engine is increased, the oxygen density in the combustion chamber 11 is increased). The reason is that as the load of the internal combustion engine is increased, the amount of fuel needed for satisfying the requested torque is increased, and the amount of air (fresh air) needed for combusting fuel is also increased.

However, even in the steady operation where the operating state of the internal combustion engine is constant, it is difficult to maintain the actual EGR rate at the target EGR rate, and an error within an allowable range may occur between the actual EGR rate and the target EGR rate. In the case of reducing combustion noise by setting the phases of two pressure waves to deviate from each other as in the first embodiment, when the actual EGR rate becomes lower than the target EGR rate due to an error caused between the actual EGR rate and the target EGR rate (when the oxygen density becomes higher than target density), the amount of increase in combustion noise from the state where the actual EGR rate is controlled to be the target EGR rate is increased when the absolute value of the peak difference ΔP is relatively small.

Figure 6:
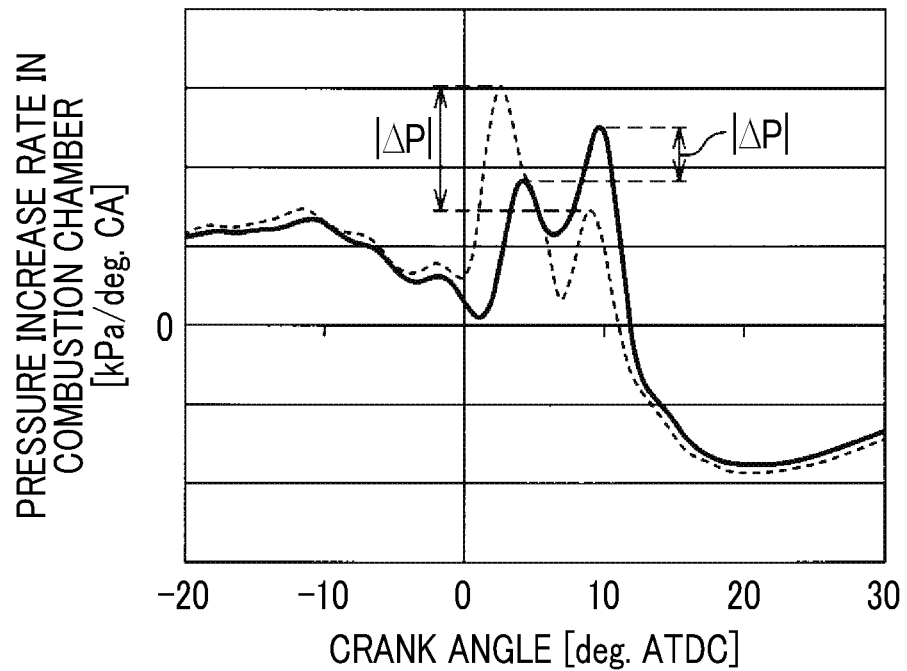
FIG. 6 is a graph illustrating a pattern of the pressure increase rate in the combustion chamber according to the first embodiment of the present disclosure by comparison between a case where the actual EGR rate is controlled to be the target EGR rate (solid line), and a case where the actual EGR rate is lower than the target EGR rate (broken line)

FIG. 6 is a graph illustrating the pattern of the pressure increase rate in the combustion chamber in the case of performing the split injection according to the first embodiment in the steady operation where the operating state of the internal combustion engine is constant, by comparison between a case where the actual EGR rate is controlled to be the target EGR rate (solid line), and a case where the actual EGR rate becomes lower than the target EGR rate (broken line).

Figure 7:
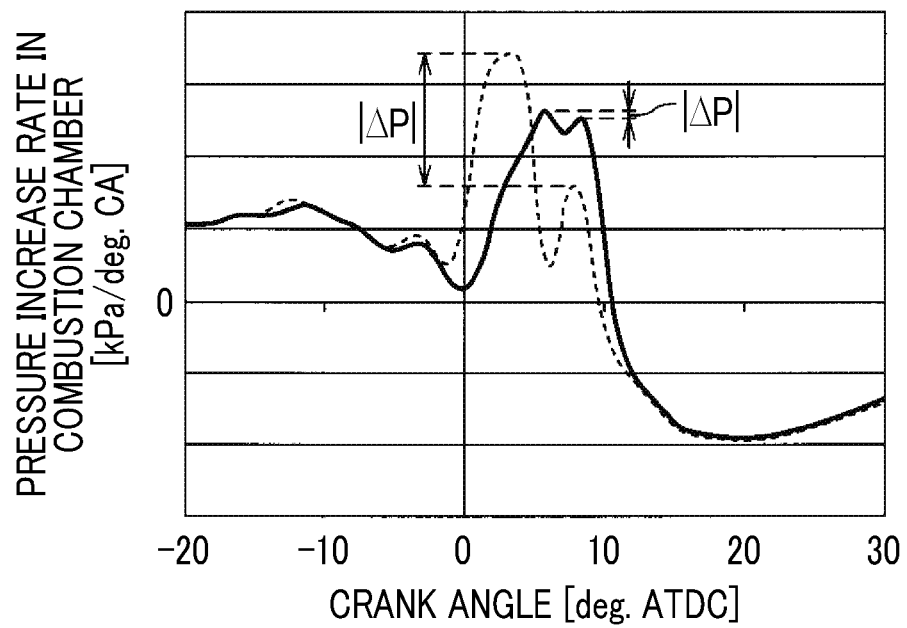
FIG. 7 is a graph illustrating the pattern of the pressure increase rate in the combustion chamber according to a comparative example by comparison between a case where the actual EGR rate is controlled to be the target EGR rate (solid line), and a case where the actual EGR rate becomes lower than the target EGR rate (broken line)

FIG. 7 is a graph illustrating the pattern of the pressure increase rate in the combustion chamber according to a comparative example where the absolute value of the peak difference ΔP is smaller than that in the first embodiment, by comparison between a case where the EGR rate is controlled to be the target EGR rate (solid line), and a case where the actual EGR rate becomes lower than the target EGR rate (broken line).

The pre-fuel and the first main fuel used for causing the premix charged compressive ignition self-ignite through various stepwise chemical reactions along with an increase in temperature T [K] in the combustion chamber and the pressure P in the combustion chamber. Thus, an ignition delay time period τ [sec] before self-ignition of the pre-fuel and the first main fuel depends on the reaction rate of the fuel from the time of injection of the pre-fuel and the first main fuel. The reaction rate of the fuel changes depending on not only the temperature T in the combustion chamber and the pressure P in the combustion chamber but also an equivalence ratio φ, a residual gas proportion (≈EGR rate) RES [%], and the like. In other words, the ignition delay time period τ changes depending on the temperature T in the combustion chamber, the pressure P in the combustion chamber, the equivalence ratio φ, the residual gas proportion RES, and the like. Specifically, the ignition delay time period τ basically tends to be shortened as the temperature T in the combustion chamber is increased, shortened as the pressure P in the combustion chamber is increased, shortened as the equivalence ratio φ is increased, and shortened as the residual gas proportion RES is decreased.

When the actual EGR rate becomes lower than the target EGR rate, the residual gas proportion RES is decreased, and the ignition delay time period τ of the pre-fuel and the first main fuel is shortened. Thus, the self-ignition timing of each of the pre-fuel and the first main fuel is advanced, and the premix charged compressive ignition occurs at an advanced crank angle closer to the compression top dead center than usual in the expansion stroke, that is, a crank angle at which the pressure P in the combustion chamber and the temperature T in the combustion chamber are higher than usual. Accordingly, when the premix charged compressive ignition occurs at a crank angle at which the pressure P in the combustion chamber and the temperature T in the combustion chamber are higher than usual, the combustion rate is increased more than usual, and combustion tends to proceed rapidly.

Consequently, as illustrated by the broken line in FIG. 6 and FIG. 7, when the actual EGR rate becomes lower than the target EGR rate, the first mountain pressure waveform Y1 of the pattern of the pressure increase rate in the combustion chamber that is mainly formed by heat release at the combustion of the first main fuel is advanced in general, and the first peak value P1 is relatively increased. Advancing the self-ignition timing of the first main fuel causes most of the first main fuel to be combusted before combustion of the second main fuel. Thus, the amount of heat release that contributes to the formation of the second mountain pressure waveform Y2 is decreased, and the second peak value P2 is decreased.

When the actual EGR rate becomes lower than the target EGR rate in a case where the target EGR rate is set to a relatively low value, the ignition delay time period τ of the pre-fuel and the first main fuel tends to be significantly affected more than when the actual EGR rate becomes lower than the target EGR rate in a case where the target EGR rate is set to a relatively high value. That is, the ignition delay time period τ of the pre-fuel and the first main fuel tends to be shortened when the actual EGR rate becomes lower than the target EGR rate in a case where the target EGR rate is set to a relatively low value.

Accordingly, when the actual EGR rate becomes lower than the target EGR rate in a case where the target EGR rate is set to a relatively low value, the amount of advance in the self-ignition timing of each of the pre-fuel and the first main fuel is increased, and the amount of increase in the first peak value P1 tends to be increased. Thus, when the target EGR rate is decreased as the load of the internal combustion engine is increased as in the first embodiment, the amount of increase in the first peak value P1 when the actual EGR rate becomes lower than the target EGR rate is increased as the load of the internal combustion engine is increased.

Accordingly, when the actual EGR rate becomes lower than the target EGR rate, the first peak value P1 is increased, and the second peak value P2 is decreased. Thus, the first peak value P1 tends to become higher than the second peak value P2.

As described above, in the first embodiment, combustion noise is reduced by setting phases to deviate from each other, for example, by setting the phase of the pressure wave mainly generated by the second heat release at the combustion of the second main fuel to be in antiphase with the phase of the pressure wave mainly generated by the first heat release at the combustion of the first main fuel. The amplitude of each pressure wave is in an approximately proportional relationship with the first peak value P1 of the first mountain pressure waveform Y1 of the pattern of the pressure increase rate in the combustion chamber that is mainly formed by heat release at the combustion of the first main fuel, and the second peak value P2 of the second mountain pressure waveform Y2 of the pattern of the pressure increase rate in the combustion chamber that is mainly formed by heat release at the combustion of the second main fuel.

Thus, basically, since the amplitude of the actual pressure wave into which each pressure wave is combined cannot be decreased as the absolute value of the peak difference ΔP is increased, the effect of reducing combustion noise is decreased, and combustion noise is increased. Accordingly, as in the comparative example illustrated in FIG. 7, relatively decreasing the absolute value of the peak difference ΔP in advance can decrease combustion noise when the actual EGR rate is controlled to be the target EGR rate.

However, when the absolute value of the peak difference ΔP is relatively decreased in advance as in the comparative example illustrated in FIG. 7, the difference (hereinafter, referred to as "amount of change in the peak difference ΔP") between the absolute value of the peak difference ΔP when the actual EGR rate becomes lower than the target EGR rate, and the absolute value of the peak difference ΔP when the EGR rate is controlled to be the target EGR rate is increased further than in the case of the first embodiment illustrated in FIG. 6.

Thus, in the case of the comparative example illustrated in FIG. 7, combustion noise is significantly increased each time the actual EGR rate becomes lower than the target EGR rate in the steady operation. As the load of the internal combustion engine is increased, the amount of increase in combustion noise is increased. Consequently, there is a possibility that a change in combustion noise in the steady operation cannot be set to securely fall within the range of an allowable amount of change, and the possibility is increased particularly when the load of the internal combustion engine is high. That is, given that reference combustion noise is set as the reference value of combustion noise at a certain load of the internal combustion engine when the actual EGR rate is controlled to be the target EGR rate in the steady operation, there is a possibility that combustion noise is increased over the allowable amount from the reference combustion noise when the actual EGR rate becomes lower than the target EGR rate, and the possibility is increased particularly when the load of the internal combustion engine is high.

Therefore, in the first embodiment, the injection amount of each of the pre-fuel injection Gp, the first main fuel injection G1, and the second main fuel injection G2 is controlled such that the peak difference Δ(=P2−P1) securely falls within the predetermined range regardless of the load of the internal combustion engine, and that the peak difference ΔP is increased by increasing the second peak value P2 as the load of the internal combustion engine is increased. The lower limit value of the predetermined range is the peak difference ΔP that causes the amount of change in combustion noise to fall within the allowable amount of change when the actual EGR rate is decreased by the maximum allowable amount of error from the target EGR rate in the steady operation. The upper limit value of the predetermined range is the peak difference ΔP that causes the value of combustion noise to become lower than or equal to its allowable upper limit value when the actual EGR rate is controlled to be the target EGR rate in the steady operation.

Accordingly, by causing the peak difference ΔP to securely fall within the predetermined range by setting the second peak value P2 to be higher than the first peak value regardless of the load of the internal combustion engine, the amount of change in the peak difference ΔP can be decreased even when the first peak value P1 is increased at the time of the actual EGR rate becoming lower than the target EGR rate. Thus, even when the actual EGR rate becomes lower than the target EGR rate in the steady operation, a change in combustion noise can be set to securely fall within the range of the allowable amount of change.

The peak difference ΔP is increased by increasing the second peak value P2 as the load of the internal combustion engine is increased. Thus, even when the amount of increase in the first peak value P1 is increased at the time of the internal combustion engine having a high load, an increase in the amount of change in the peak difference ΔP can be suppressed. Thus, even when the load of the internal combustion engine is high, a change in combustion noise when the actual EGR rate becomes lower than the target EGR rate can be set to securely fall within the range of the allowable amount of change.

Figure 8:
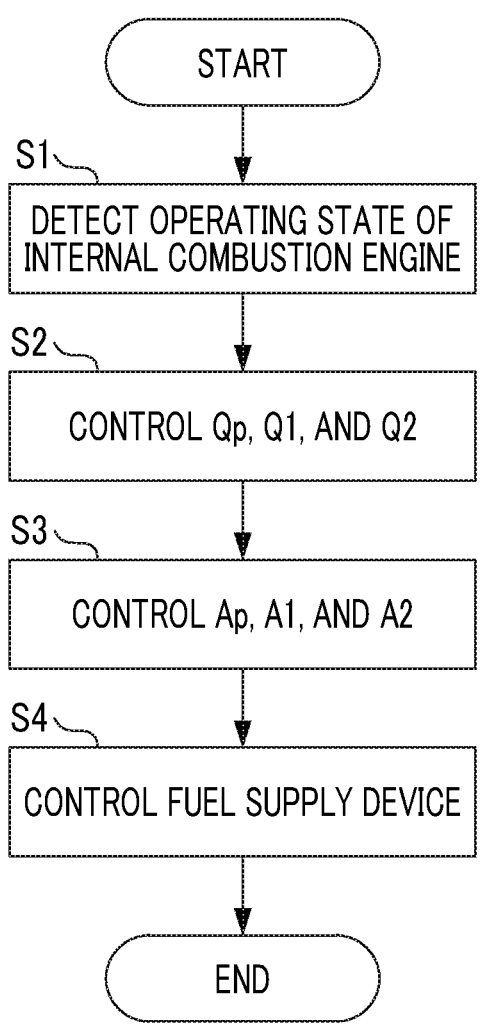
FIG. 8 is a flowchart for describing a fuel injection control according to the first embodiment of the present disclosure.
Figure 9:
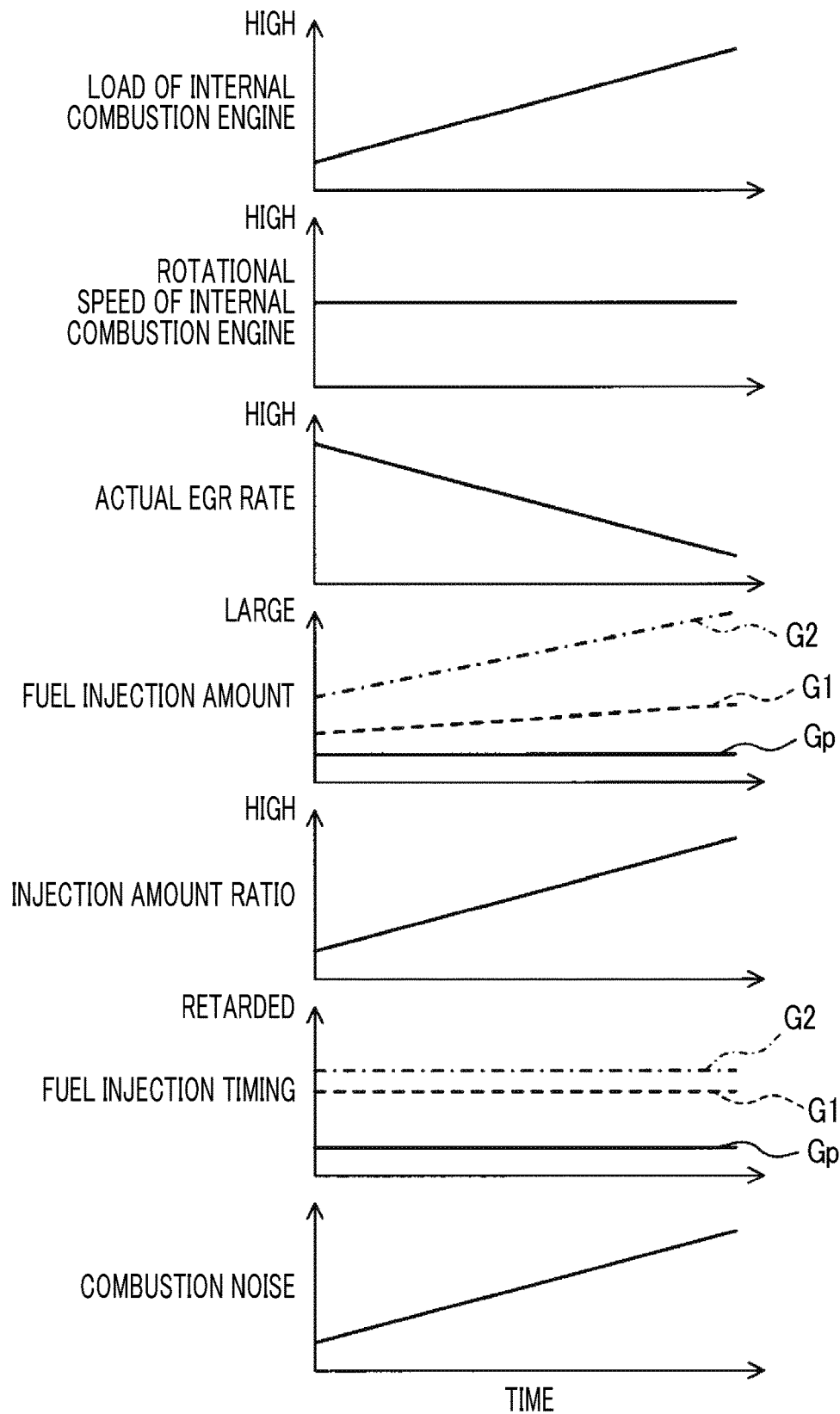
FIG. 9 is a timing chart illustrating operation of the fuel injection control according to the first embodiment of the present disclosure.

FIG. 8 is a flowchart for describing the fuel injection control according to the first embodiment. The electronic control unit 200 repeatedly executes the present routine at predetermined calculation cycles (for example, 10 [ms]) during the operation of the engine. FIG. 9 is a timing chart illustrating operation of the fuel injection control according to the first embodiment.

In step S1, the electronic control unit 200 detects the operating state of the internal combustion engine by reading the rotational speed of the internal combustion engine calculated based on the output signal of the crank angle sensor 218, and the load of the internal combustion engine detected by the load sensor 217.

In step S2, the electronic control unit 200 controls a target injection amount Qp of the pre-fuel injection Gp, a target injection amount Q1 of the first main fuel injection G1, and a target injection amount Q2 of the second main fuel injection G2. In the first embodiment, the electronic control unit 200 references a graph in FIG. 10 that is produced in advance by experiment and the like, and controls the target injection amount Qp of the pre-fuel injection Gp, the target injection amount Q1 of the first main fuel injection G1, and the target injection amount Q2 of the second main fuel injection G2 based on at least the load of the internal combustion engine.

Figure 10:
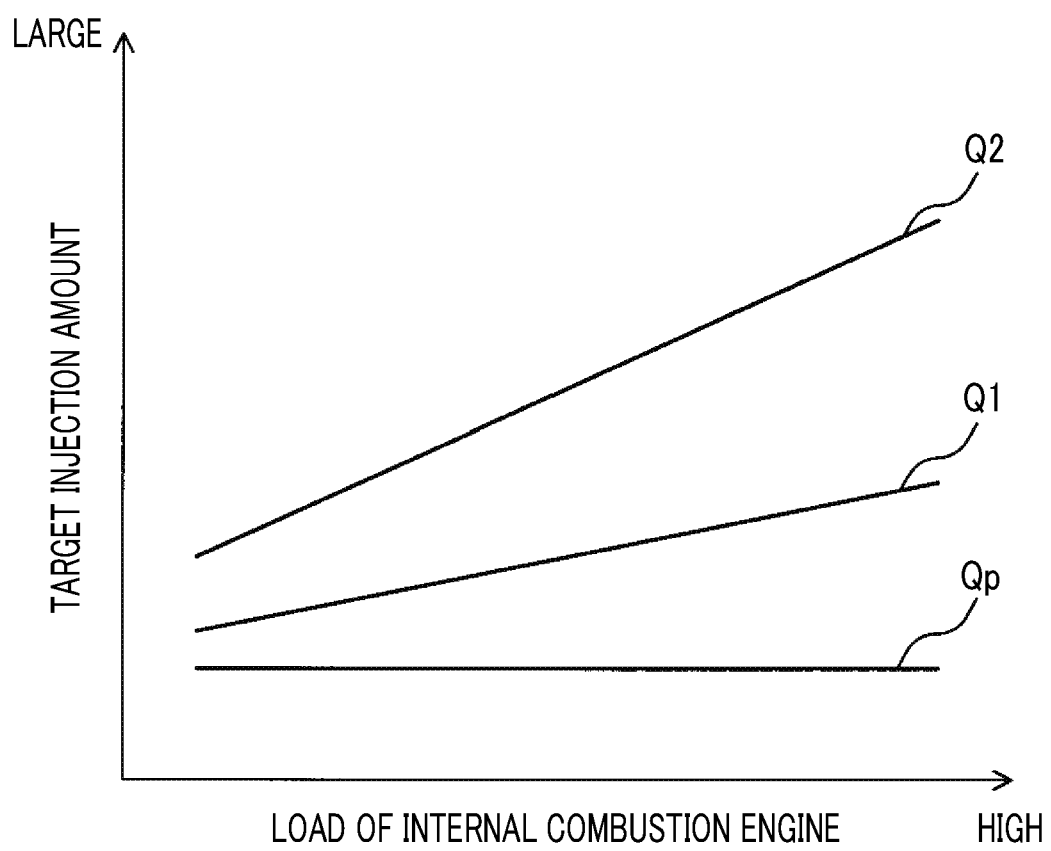
FIG. 10 is a graph according to the first embodiment of the present disclosure for controlling a target injection amount of pre-fuel injection, a target injection amount of first main fuel injection, and a target fuel injection amount of second main fuel injection based on the load of the internal combustion engine.

As illustrated in FIG. 10, the target injection amount Qp of the pre-fuel injection Gp is controlled to be a constant value regardless of the load of the internal combustion engine. The target injection amount Q1 of the first main fuel injection G1 and the target injection amount Q2 of the second main fuel injection G2 are controlled such that the target injection amount Q2 of the second main fuel injection G2 becomes larger than the target injection amount Q1 of the first main fuel injection G1 regardless of the load of the internal combustion engine. While each of the target injection amount Q1 of the first main fuel injection G1 and the target injection amount Q2 of the second main fuel injection G2 is controlled to be increased as the load of the internal combustion engine is increased, the increased proportion when the load of the internal combustion engine is increased is controlled such that the increased proportion of the target injection amount Q2 of the second main fuel injection G2 becomes higher than the increased proportion of the target injection amount Q1 of the first main fuel injection G1.

Figure 11:
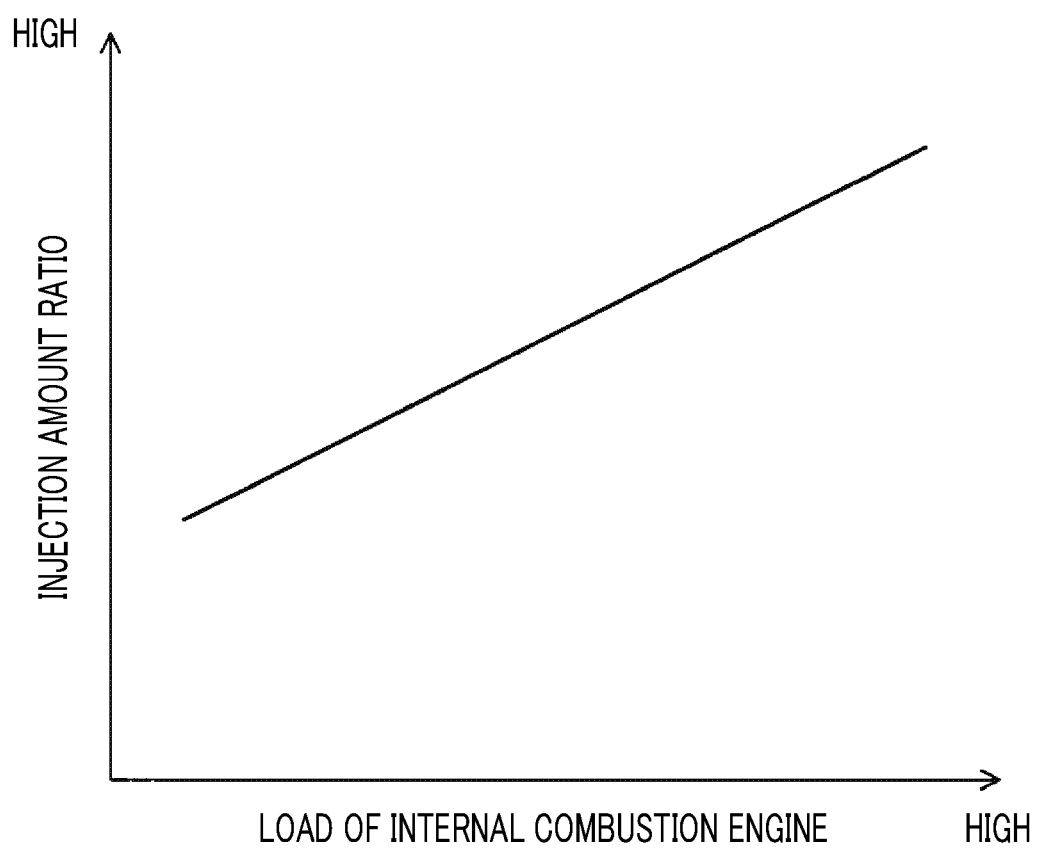
FIG. 11 is a graph illustrating a relationship between the load of the internal combustion engine and an injection amount ratio according to the first embodiment of the present disclosure.

That is, in the first embodiment, the target injection amount Q1 of the first main fuel injection G1 and the target injection amount Q2 of the second main fuel injection G2 are controlled such that the injection amount ratio (=Q2/Q1) of the second main fuel injection G2 that is acquired by dividing the target injection amount Q2 of the second main fuel injection G2 by the target injection amount Q1 of the first main fuel injection G1 is increased as the load of the internal combustion engine is increased as illustrated in FIG. 11.

Accordingly, regardless of the load of the internal combustion engine, the target injection amount Q2 of the second main fuel injection G2 that mainly contributes to the formation of the second mountain pressure waveform Y2 is increased further than the target injection amount Q1 of the first main fuel injection G1 that mainly contributes to the formation of the first mountain pressure waveform Y1 of the pattern of the pressure increase rate in the combustion chamber. Thus, the second peak value P2 can be set to be higher than the first peak value P1 regardless of the load of the internal combustion engine. In addition, the injection amount ratio of the second main fuel injection G2 is increased as the load of the internal combustion engine is increased. Thus, the peak difference ΔP can be increased by increasing the second peak value P2 in advance as the load of the internal combustion engine is increased.

In step S3, the electronic control unit 200 controls a target injection timing Ap of the pre-fuel injection Gp, a target injection timing A1 of the first main fuel injection G1, and a target injection timing A2 of the second main fuel injection G2. In the first embodiment, the electronic control unit 200 controls the target injection timing Ap of the pre-fuel injection Gp, the target injection timing A1 of the first main fuel injection G1, and the target injection timing A2 of the second main fuel injection G2 to be predetermined timings set in advance regardless of the operating state of the internal combustion engine such that the pre-fuel and the first main fuel are used for causing the premix charged compressive ignition, and that the second main fuel is used for causing the diffusive combustion.

In step S4, the electronic control unit 200 operates the engine main body 1 by injecting the target injection amounts Qp, Q1, Q2 of fuel at the target injection timings Ap, A1, A2 of the fuel injection Gp, G1, G2.

According to the first embodiment described thus far, the electronic control unit 200 (control device) that controls the internal combustion engine 100 including the engine main body 1, the fuel injection valve 20 injecting fuel into the combustion chamber 11 in the engine main body 1, and the intake device 3 configured to change the oxygen density in the combustion chamber 11 is configured to control the fuel injection valve 20 to inject at least primary fuel and secondary fuel in this order and cause heat release twice in a stepwise manner in the combustion chamber 11 such that the shape of the pattern of the pressure increase rate in the combustion chamber has two mountains including a first peak and a second peak occurring after the first peak. In addition, the electronic control unit 200 is configured to control the intake device 3 such that the oxygen density in the combustion chamber 11 is increased along with an increase in the load of the internal combustion engine.

The electronic control unit 200 is configured to control the injection timing and the injection amount of each of the first main fuel (primary fuel) and the second main fuel (secondary fuel) such that the second peak value P2 of the second mountain of the pattern of the pressure increase rate in the combustion chamber formed by the second heat release becomes higher than the first peak value P1 of the first mountain of the pattern of the pressure increase rate in the combustion chamber formed by the first heat release, and that the peak difference ΔP acquired by subtracting the first peak value P1 from the second peak value P2 is increased as the load of the internal combustion engine is increased.

Specifically, the electronic control unit is configured to control the injection amount of the second main fuel to become larger than the injection amount of the first main fuel. The electronic control unit is configured to control the injection amount of each of the first main fuel and the second main fuel such that the injection amount ratio acquired by dividing the injection amount of the second main fuel by the injection amount of the first main fuel is increased as the load of the internal combustion engine is increased.

Accordingly, by setting the second peak value P2 to be higher than the first peak value P1, the amount of change in the peak difference ΔP can be decreased even when the first peak value p1 is increased at the time of the actual EGR rate becoming lower than the target EGR rate. Thus, even when the actual EGR rate becomes lower than the target EGR rate in the steady operation, a change in combustion noise can be set to securely fall within the range of the allowable amount of change.

The peak difference ΔP is increased as the load of the internal combustion engine is increased. Thus, even when the amount of increase in the first peak value P1 is increased at the time of the internal combustion engine having a high load, an increase in the amount of change in the peak difference ΔP can be suppressed. Thus, even when the load of the internal combustion engine is high, a change in combustion noise when the actual EGR rate becomes lower than the target EGR rate can be set to securely fall within the range of the allowable amount of change.

Second Embodiment

Next, a second embodiment of the present disclosure will be described. The second embodiment is different from the first embodiment in that the target injection amount Qp of the pre-fuel injection Gp is increased as the rotational speed of the internal combustion engine is increased. Hereinafter, the difference in the second embodiment will be mainly described.

In the first embodiment, heat release is caused twice in a stepwise manner at appropriate intervals to set the phase of the pressure wave generated by the second heat release to deviate from the phase of the pressure wave generated by the first heat release, thereby reducing combustion noise.

In the case of reducing combustion noise by setting the phase of each pressure wave to deviate from each other, the time interval from the timing of the first heat release to the timing of the second heat release needs to be constantly maintained in order to constantly maintain the effect of reducing combustion noise.

Accordingly, given that the timing of the first heat release corresponds to a crank angle (hereinafter, referred to as "first peak crank angle") θ1 at which the pattern of the pressure increase rate in the combustion chamber described with reference to, for example, FIG. 3 has the first peak value P1, and that the timing of the second heat release corresponds to a crank angle (hereinafter, referred to as "second peak crank angle") θ2 at which the pattern of the pressure increase rate in the combustion chamber has the second peak value P2, a crank interval Δθ (=θ2−θ1) between the first peak crank angle θ1 and the second peak crank angle θ2 needs to be changed in accordance with the rotational speed of the internal combustion engine in order to constantly maintain the time interval from the timing of the first heat release to the timing of the second heat release. Specifically, the crank interval 40 needs to be increased as the rotational speed of the internal combustion engine is increased.

Therefore, in the second embodiment, the target injection amount Qp of the pre-fuel injection Gp that is set as a constant value regardless of the operating state of the internal combustion engine in the first embodiment is increased as the rotational speed of the internal combustion engine is increased, thereby advancing the first peak crank angle θ1.

As described above, the pre-fuel injection Gp is basically injection that causes the pre-fuel to self-ignite at a crank angle advanced from that for the first main fuel, thereby increasing the temperature in the combustion chamber to cause self-ignition of the first main fuel. Accordingly, by increasing the target injection amount Qp of the pre-fuel injection Gp, the amount of increase in the temperature T in the combustion chamber can be increased, and the self-ignition timing of the first main fuel can be advanced. Thus, the first peak crank angle θ1 can be advanced. Hereinafter, the fuel injection control according to the second embodiment will be described.

Figure 12:
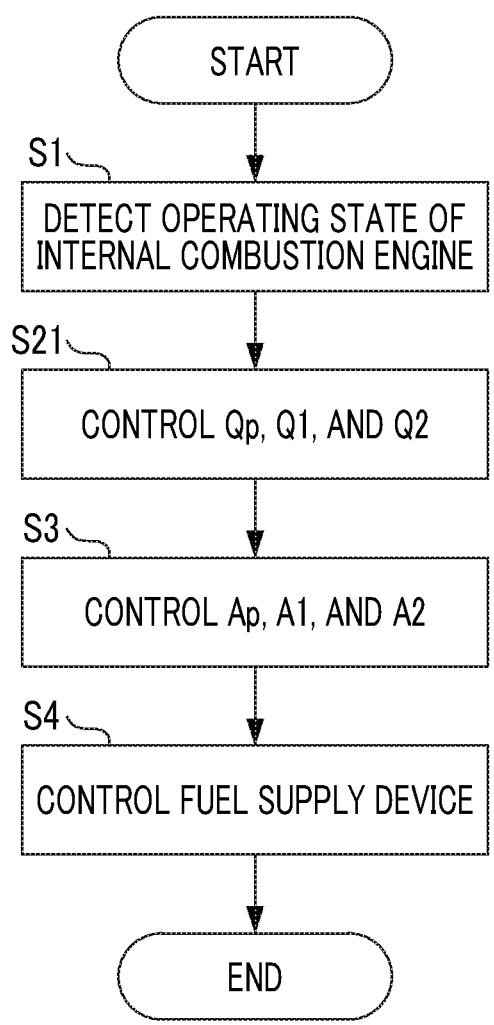
FIG. 12 is a flowchart for describing a fuel injection control according to a second embodiment of the present disclosure.
Figure 13:
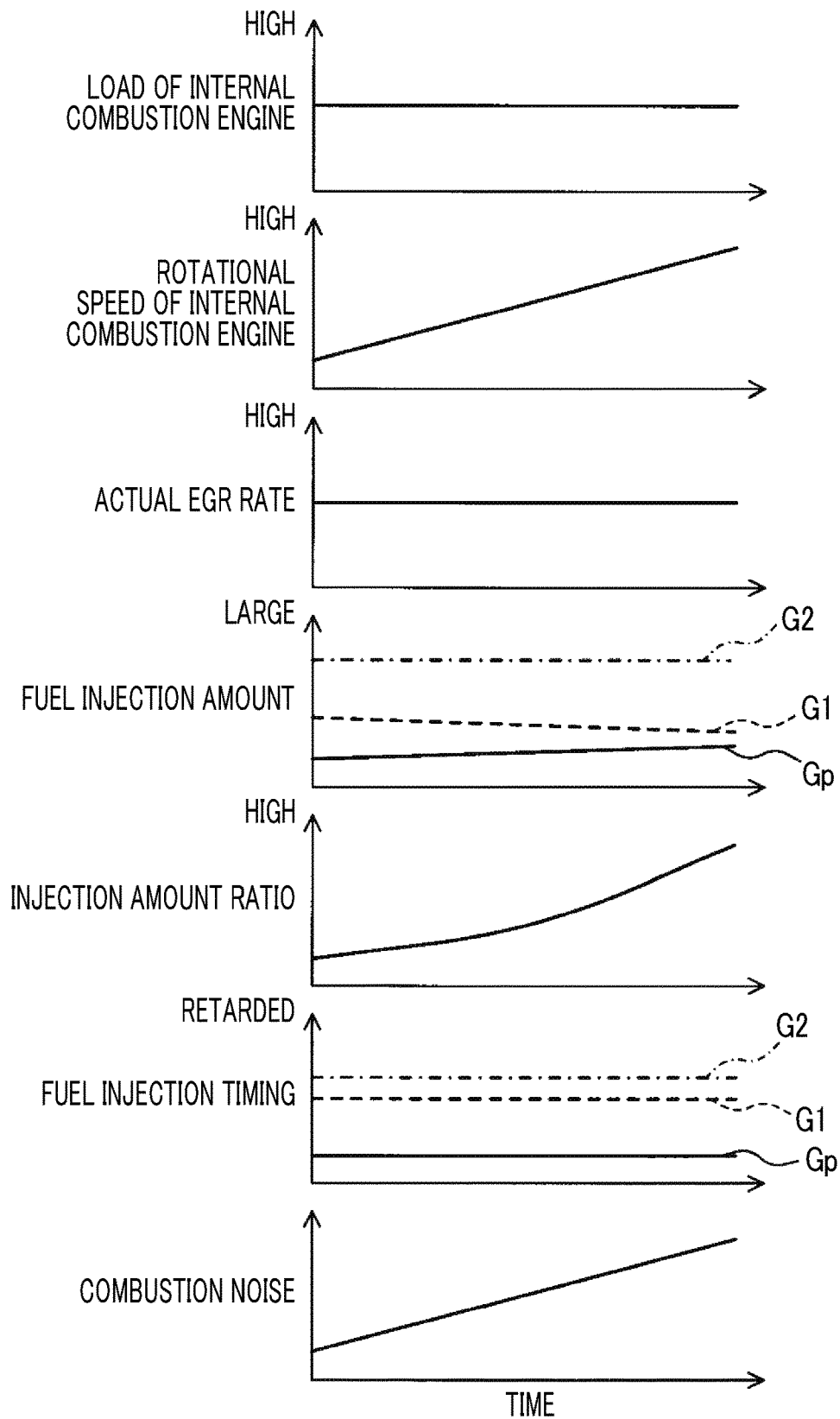
FIG. 13 is a timing chart illustrating operation of the fuel injection control according to the second embodiment of the present disclosure.

FIG. 12 is a flowchart for describing the fuel injection control according to the second embodiment. FIG. 13 is a timing chart illustrating operation of the fuel injection control according to the second embodiment.

Processes performed in steps S1, S3, S4 are the same as those in the first embodiment and thus, are not described here.

In step S21, the electronic control unit 200 controls the target injection amount Qp of the pre-fuel injection Gp, the target injection amount Q1 of the first main fuel injection G1, and the target injection amount Q2 of the second main fuel injection G2.

Figure 14:
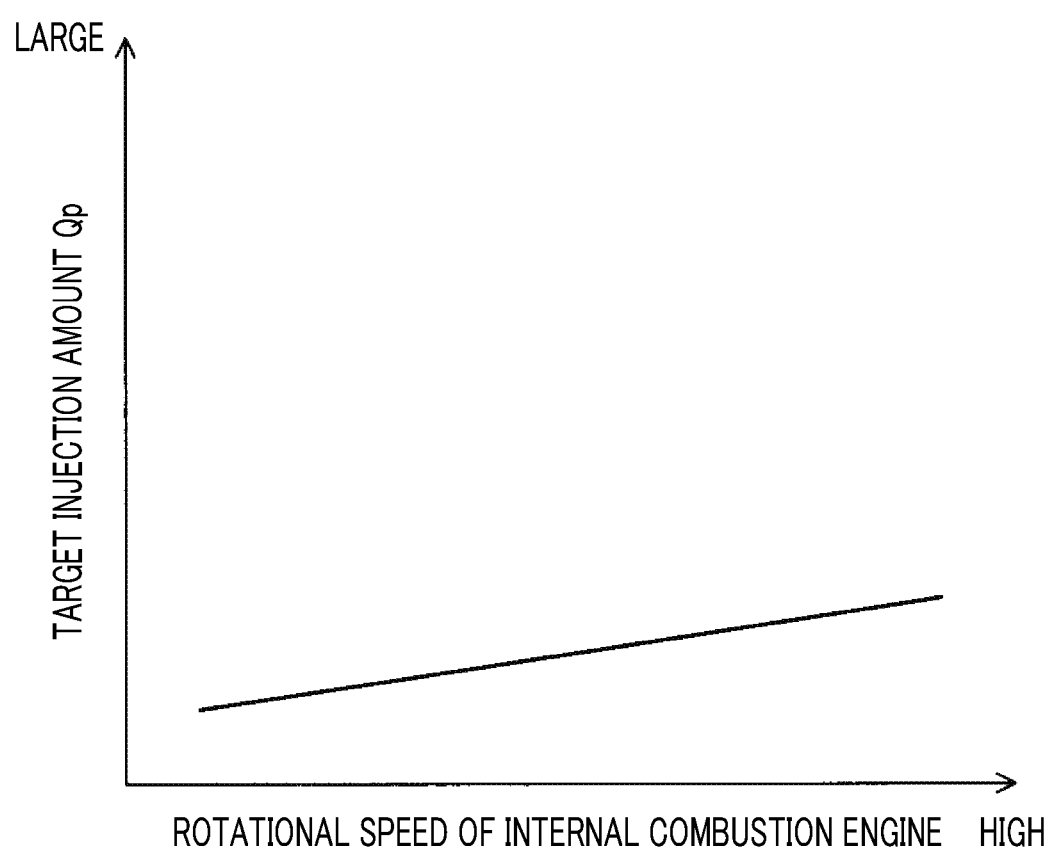
FIG. 14 is a graph according to the second embodiment of the present disclosure for controlling the target injection amount of the pre-fuel injection based on a rotational speed of the internal combustion engine.

In the second embodiment, the electronic control unit 200 references a graph in FIG. 14 that is produced in advance by experiment and the like, and controls the target injection amount Qp of the pre-fuel injection Gp based on the rotational speed of the internal combustion engine. The electronic control unit 200 references a map in FIG. 15 that is produced in advance by experiment and the like, and controls the target injection amount Q1 of the first main fuel injection G1 based on the load of the internal combustion engine and the rotational speed of the internal combustion engine. The electronic control unit 200 references the graph in FIG. 7 as in the first embodiment and controls the target injection amount Q2 of the second main fuel injection G2 based on the load of the internal combustion engine.

As illustrated in FIG. 14, the target injection amount Qp of the pre-fuel injection Gp is controlled to be increased as the rotational speed of the internal combustion engine is increased.

Figure 15:
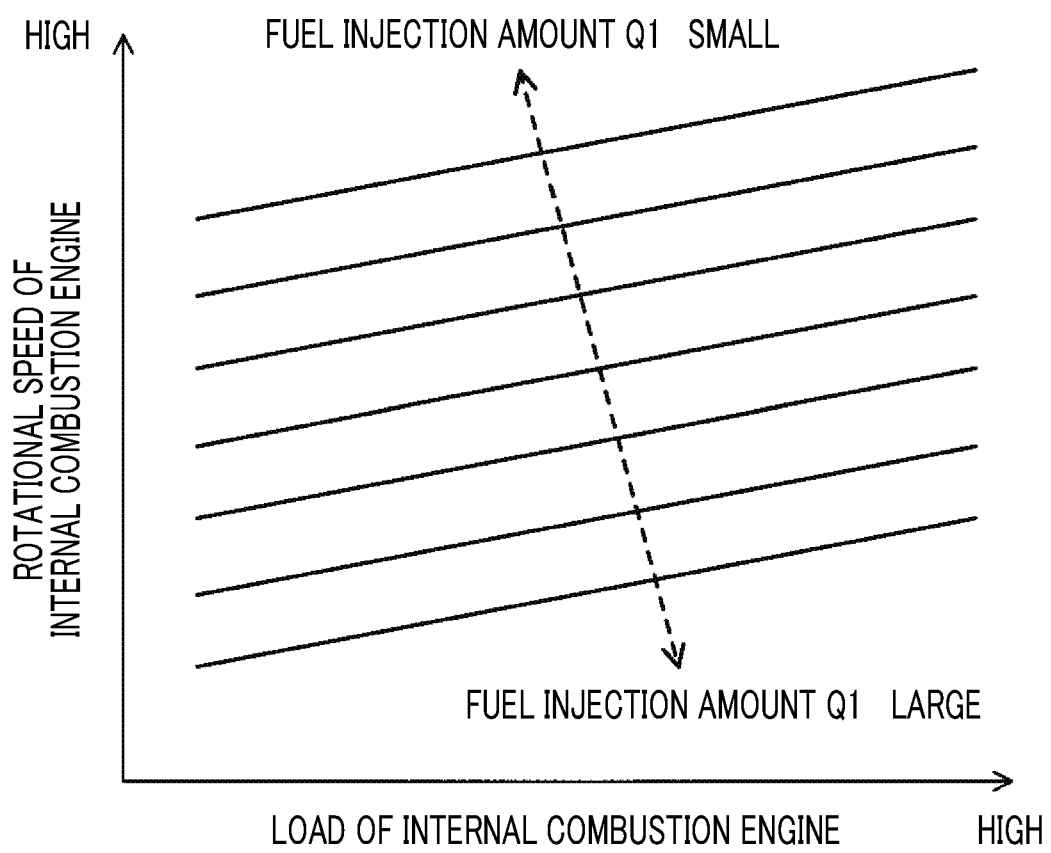
FIG. 15 is a map according to the second embodiment of the present disclosure for controlling the target injection amount of the first main fuel injection based on the load of the internal combustion engine and the rotational speed of the internal combustion engine.

As illustrated in FIG. 15, when the rotational speed of the internal combustion engine is the same, the target injection amount Q1 of the first main fuel injection G1 is controlled to be increased as the load of the internal combustion engine is increased. When the load of the internal combustion engine is the same, the target injection amount Q1 of the first main fuel injection G1 is controlled to be decreased as the rotational speed of the internal combustion engine is increased. That is, in the second embodiment, the target injection amount Qp of the pre-fuel injection Gp is increased, and the target injection amount Q1 of the first main fuel injection G1 is decreased by the amount corresponding to the increase in the target injection amount Qp of the pre-fuel injection Gp as the rotational speed of the internal combustion engine is increased.

According to the second embodiment described thus far, the electronic control unit 200 is configured to inject the pre-fuel before the injection of the first main fuel (primary fuel). The electronic control unit 200 is configured to control the injection amount of the pre-fuel to be increased such that the crank interval Δθ from the crank angle θ1 at which the pattern of the pressure increase rate in the combustion chamber has the first peak value P1, to the crank angle θ2 at which the pattern of the pressure increase rate in the combustion chamber has the second peak value P2 is increased as the rotational speed of the internal combustion engine is increased.

Accordingly, by increasing the injection amount of the pre-fuel, the amount of increase in the temperature T in the combustion chamber can be increased, and the self-ignition timing of the first main fuel can be advanced. Thus, by advancing the first peak crank angle θ1, the time interval from the timing of the first heat release to the timing of the second heat release can be constantly maintained regardless of the rotational speed of the internal combustion engine. Accordingly, since heat release can be caused twice in a stepwise manner at appropriate intervals regardless of the rotational speed of the internal combustion engine, combustion noise can be reduced by setting the phase of the pressure wave generated by the first heat release to deviate from the phase of the pressure wave generated by the second heat release.

Third Embodiment

Next, a third embodiment of the present disclosure will be described. The third embodiment is different from the first embodiment in that as the rotational speed of the internal combustion engine is increased, the target injection timing A2 of the second main fuel injection G2 is retarded, and the target injection amount Q2 of the second main fuel injection G2 is increased. Hereinafter, the difference in the third embodiment will be mainly described.

In the second embodiment, in order to constantly maintain the time interval from the timing of the first heat release to the timing of the second heat release, the first peak crank angle θ1 is advanced by increasing the target injection amount Qp of the pre-fuel injection Gp as the rotational speed of the internal combustion engine is increased.

Unlike the second embodiment, in the third embodiment, the second peak crank angle θ2 is retarded by retarding the target injection timing A2 of the second main fuel injection G2 as the rotational speed of the internal combustion engine is increased.

In the case of retarding the target injection timing A2 of the second main fuel injection G2, the diffusive combustion occurs at a crank angle further retarded from the compression top dead center than usual in the expansion stroke. Thus, combustion proceeds more slowly than usual, and the second peak value P2 of the pressure waveform Y2 of the pattern of the pressure increase rate in the combustion chamber tends to be decreased.

Accordingly, since a decrease in the second peak value P2 leads to a decrease in the peak difference ΔP, the amplitude of the actual pressure wave into which the pressure wave generated by the first heat release and the pressure wave generated by the second heat release are combined is increased, and combustion noise is increased.

Thus, in the third embodiment, in order to suppress a decrease in the second peak value P2, the target injection timing A2 of the second main fuel injection G2 is retarded, and the target injection amount Q2 of the second main fuel injection G2 is increased as the rotational speed of the internal combustion engine is increased.

Accordingly, the time interval from the timing of the first heat release to the timing of the second heat release can be constantly maintained. In addition, since a decrease in the second peak value P2 caused by retarding the target injection timing A2 of the second main fuel injection G2 can be suppressed, an increase in the amplitude of the actual pressure wave into which the pressure wave generated by the first heat release and the pressure wave generated by the second heat release are combined can be suppressed. Thus, an increase in combustion noise can be suppressed. Hereinafter, the fuel injection control according to the third embodiment will be described.

Figure 16:
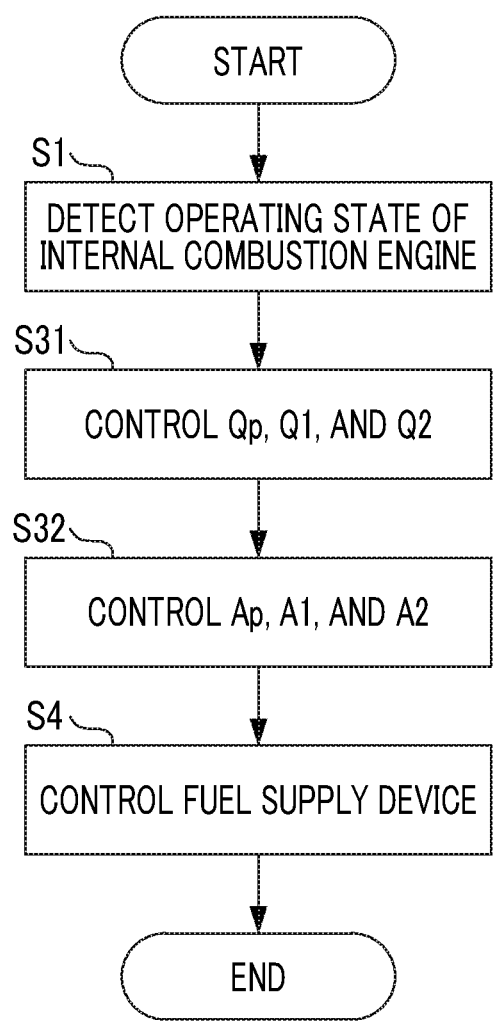
FIG. 16 is a flowchart for describing a fuel injection control according to a third embodiment of the present disclosure.
Figure 17:
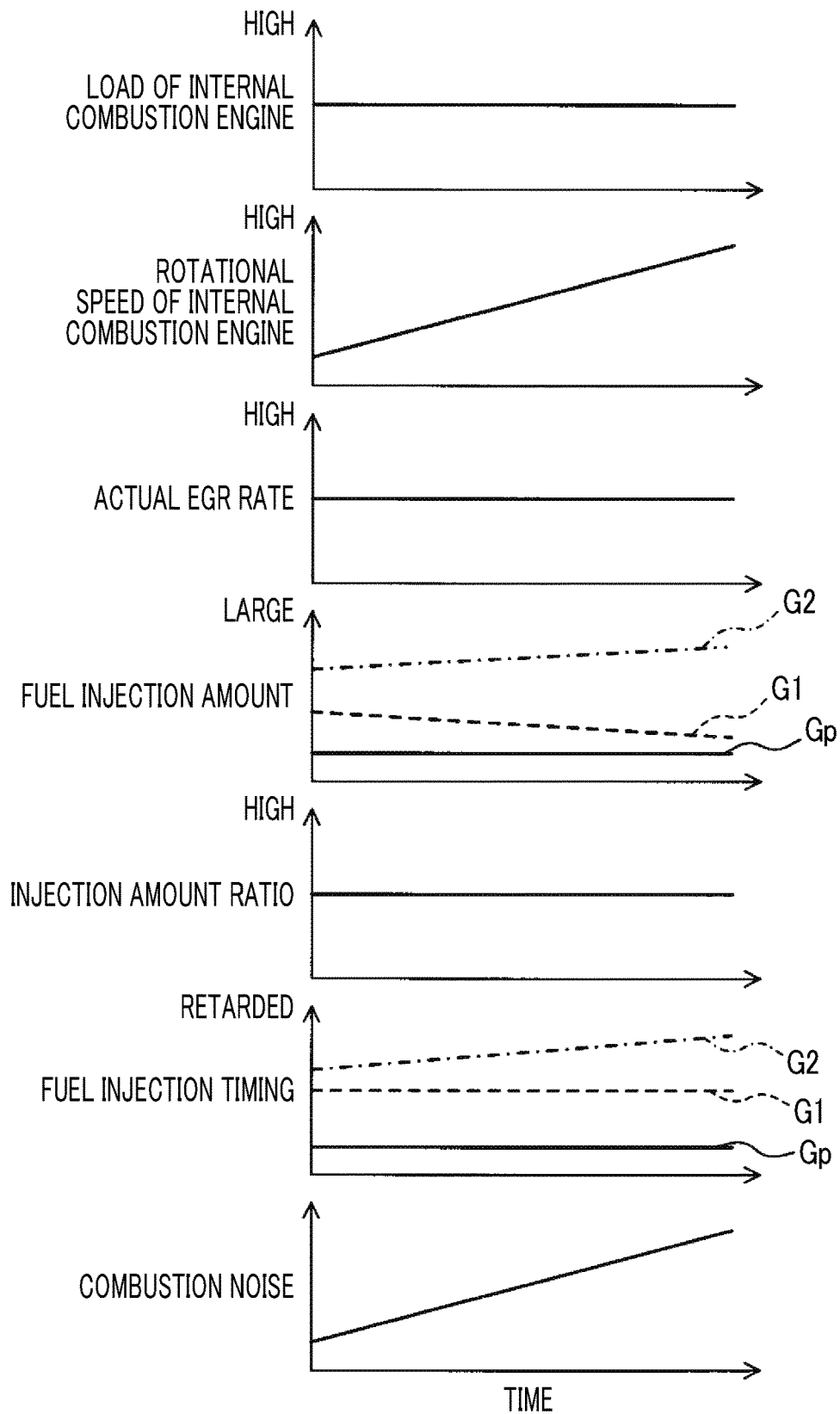
FIG. 17 is a timing chart illustrating operation of the fuel injection control according to the third embodiment of the present disclosure.

FIG. 16 is a flowchart for describing the fuel injection control according to the third embodiment. FIG. 17 is a timing chart illustrating operation of the fuel injection control according to the third embodiment.

Processes performed in steps S1, S4 are the same as those in the first embodiment and thus, are not described here.

In step S31, the electronic control unit 200 controls the target injection amount Qp of the pre-fuel injection Gp, the target injection amount Q1 of the first main fuel injection G1, and the target injection amount Q2 of the second main fuel injection G2.

In the third embodiment, the electronic control unit 200 references the graph in FIG. 7 as in the first embodiment and controls the target injection amount Qp of the pre-fuel injection Gp based on the load of the internal combustion engine. The electronic control unit 200 references maps in FIG. 18 and FIG. 19 that are produced in advance by experiment and the like, and controls the target injection amount Q1 of the first main fuel injection G1 and the target injection amount Q2 of the second main fuel injection G2 based on the load of the internal combustion engine and the rotational speed of the internal combustion engine.

Figure 18:
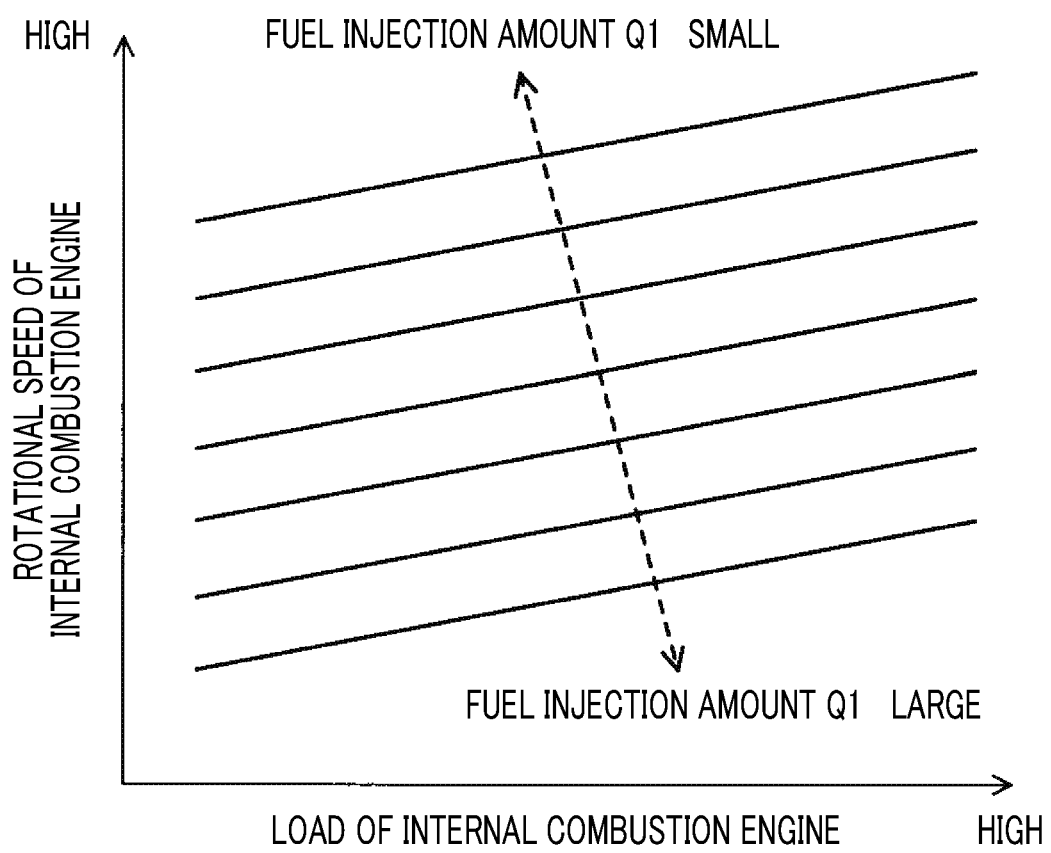
FIG. 18 is a map according to the third embodiment of the present disclosure for controlling the target injection amount of the first main fuel injection based on the load of the internal combustion engine and the rotational speed of the internal combustion engine.
Figure 19:
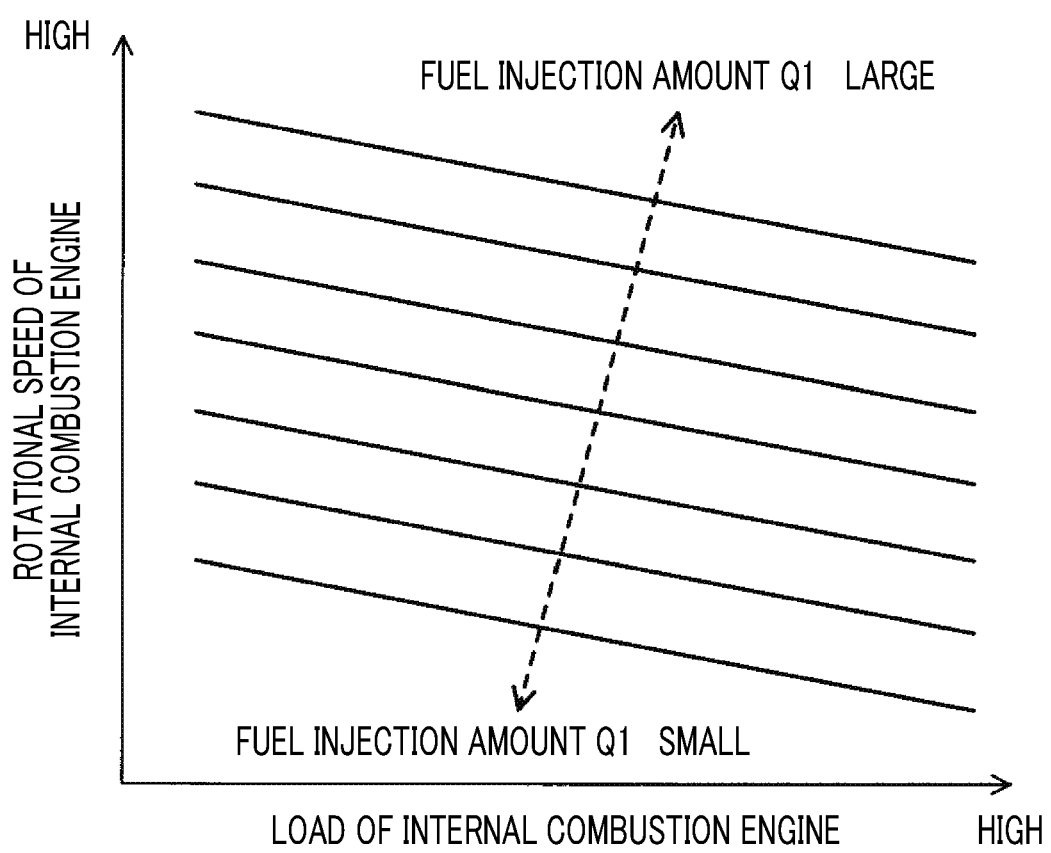
FIG. 19 is a map according to the third embodiment of the present disclosure for controlling the target injection amount of the second main fuel injection based on the load of the internal combustion engine and the rotational speed of the internal combustion engine.

As illustrated in FIG. 18, when the rotational speed of the internal combustion engine is the same, the target injection amount Q1 of the first main fuel injection G1 is controlled to be increased as the load of the internal combustion engine is increased. When the load of the internal combustion engine is the same, the target injection amount Q1 of the first main fuel injection G1 is controlled to be decreased as the rotational speed of the internal combustion engine is increased. As illustrated in FIG. 19, when the rotational speed of the internal combustion engine is the same, the target injection amount Q2 of the second main fuel injection G2 is controlled to be increased as the load of the internal combustion engine is increased. When the load of the internal combustion engine is the same, the target injection amount Q1 of the first main fuel injection G1 is controlled to be increased as the rotational speed of the internal combustion engine is increased. That is, in the third embodiment, the target injection amount Q2 of the second main fuel injection G2 is increased, and the target injection amount Q1 of the first main fuel injection G1 is decreased by the amount corresponding to the increase in the target injection amount Q2 of the second main fuel injection G2 as the rotational speed of the internal combustion engine is increased.

In step S32, the electronic control unit 200 controls the target injection timing Ap of the pre-fuel injection Gp, the target injection timing A1 of the first main fuel injection G1, and the target injection timing A2 of the second main fuel injection G2. In the third embodiment, the electronic control unit 200 controls the target injection timing Ap of the pre-fuel injection Gp and the target injection timing A1 of the first main fuel injection G1 to be predetermined timings set in advance regardless of the operating state of the internal combustion engine. The electronic control unit 200 references a graph in FIG. 20 that is produced in advance by experiment and the like, and controls the target injection timing A2 of the second main fuel injection G2 based on the rotational speed of the internal combustion engine.

Figure 20:
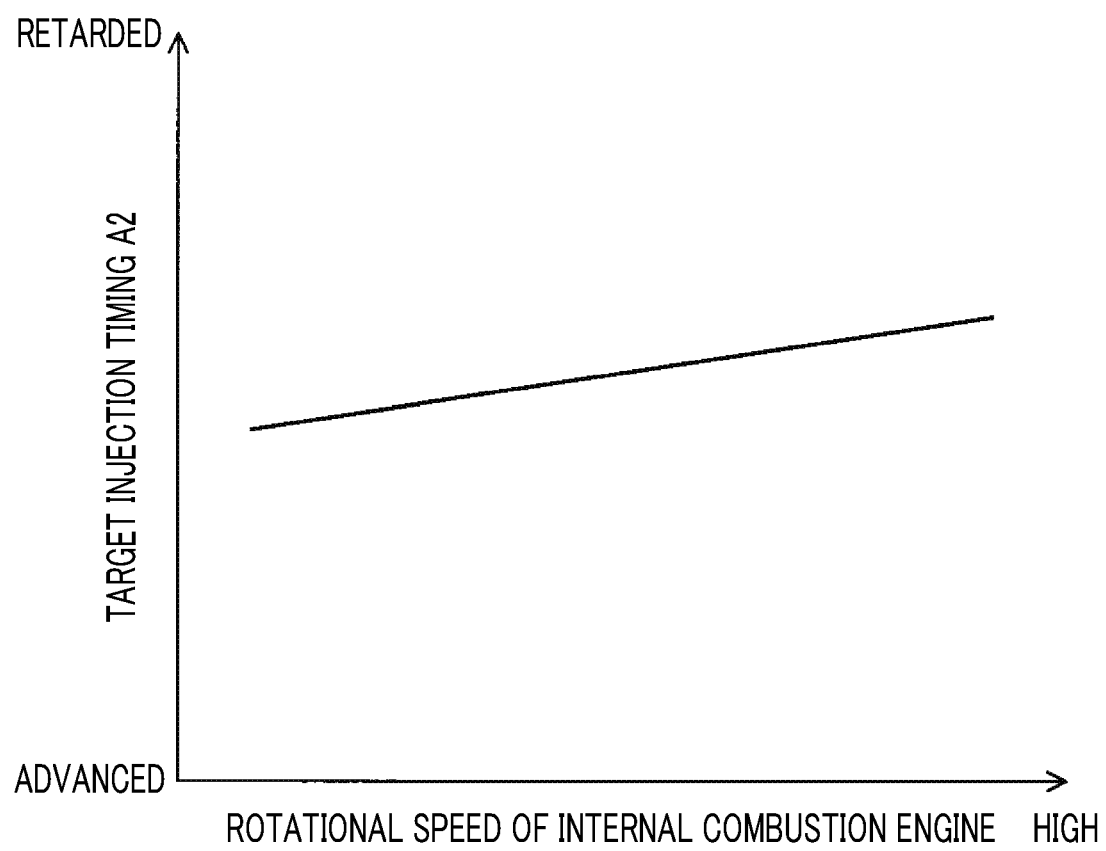
FIG. 20 is a graph according to the third embodiment of the present disclosure for controlling a target injection timing of the second main fuel injection based on the rotational speed of the internal combustion engine.

As illustrated in FIG. 20, the target injection timing A2 of the second main fuel injection G2 is controlled to occur at a more retarded crank angle as the rotational speed of the internal combustion engine is increased.

According to the third embodiment described thus far, the electronic control unit 200 is configured to control the injection timing of the second main fuel (secondary fuel) to be retarded and control the injection amount of the second main fuel to be increased such that the crank interval 40 from the crank angle θ1 at which the pattern of the pressure increase rate in the combustion chamber has the first peak value P1, to the crank angle θ2 at which the pattern of the pressure increase rate in the combustion chamber has the second peak value P2 is increased as the rotational speed of the internal combustion engine is increased.

Accordingly, by retarding the injection timing of the second main fuel as the rotational speed of the internal combustion engine is increased, the second peak crank angle θ2 is retarded, and the time interval from the timing of the first heat release to the timing of the second heat release can be constantly maintained regardless of the rotational speed of the internal combustion engine. In addition, by increasing the injection amount of the second main fuel as the rotational speed of the internal combustion engine is increased, a decrease in the second peak value P2 caused by retarding the injection timing of the second main fuel can be suppressed. Thus, an increase in the amplitude of the actual pressure wave into which the pressure wave generated by the first heat release and the pressure wave generated by the second heat release are combined can be suppressed. Thus, an increase in combustion noise can be suppressed.

Fourth Embodiment

Next, a fourth embodiment of the present disclosure will be described. The fourth embodiment is different from the first embodiment in that the target injection amount Q1 of the first main fuel injection G1 and the target injection amount Q2 of the second main fuel injection G2 are corrected when the load of the internal combustion engine is changed to a low load side from a high load side. Hereinafter, the difference in the fourth embodiment will be mainly described.

In the case of decreasing the target EGR rate as the load of the internal combustion engine is increased, when the load of the internal combustion engine is changed to a low load side from a high load side, the target EGR rate is changed to a high value from a low value. However, a time delay corresponding to the length or the like of the intake passage 30 or the EGR passage 32 occurs before the actual EGR rate becomes equal to the target EGR rate. Thus, when the load of the internal combustion engine is changed to a low load side from a high load side, the actual EGR rate transiently becomes lower than the target EGR rate after the change in load.

Accordingly, even at a transient operation (hereinafter, referred to as "first transient operation") where the load of the internal combustion engine is changed to a low load side from a high load side, the first mountain pressure waveform Y1 of the pattern of the pressure increase rate in the combustion chamber that is mainly formed by heat release at the combustion of the first main fuel is advanced in general, and the first peak value P1 is increased. Advancing the self-ignition timing of the first main fuel causes most of the first main fuel to be combusted before combustion of the second main fuel. Thus, the amount of heat release that contributes to the formation of the second mountain pressure waveform Y2 is decreased, and the second peak value P2 is decreased.

Therefore, in the fourth embodiment, in order to suppress an increase in the first peak value P1 and a decrease in the second peak value P2 in the first transient operation, the target injection amount Q1 of the first main fuel injection G1 and the target injection amount Q2 of the second main fuel injection G2 are corrected in the first transient operation based on a first difference value $\Delta EGR1$ that is acquired by subtracting the estimated value of the actual EGR rate (hereinafter, referred to as "estimated EGR rate") from the target EGR rate.

Specifically, when the first difference value $\Delta EGR1$ is large, that is, as the actual EGR rate becomes lower than the target EGR rate after the change in load, the ignition delay time period τ of the first main fuel is shortened. Thus, the first mountain pressure waveform Y1 of the pattern of the pressure increase rate in the combustion chamber is advanced, and the first peak value P1 tends to be increased. Therefore, the target injection amount Q1 of the first main fuel injection G1 is corrected to be decreased. The target injection amount Q2 of the second main fuel injection G2 is corrected to be increased by the amount corresponding to the decrease in the target injection amount Q1 of the first main fuel injection G1. Accordingly, the amount of heat release at the combustion of the first main fuel can be decreased, and an increase in the first peak value P1 can be sufficiently suppressed. The amount of heat release at the combustion of the second main fuel can be increased, and a decrease in the second peak value P2 can be sufficiently suppressed. Hereinafter, the fuel injection control according to the fourth embodiment will be described.

Figure 21:
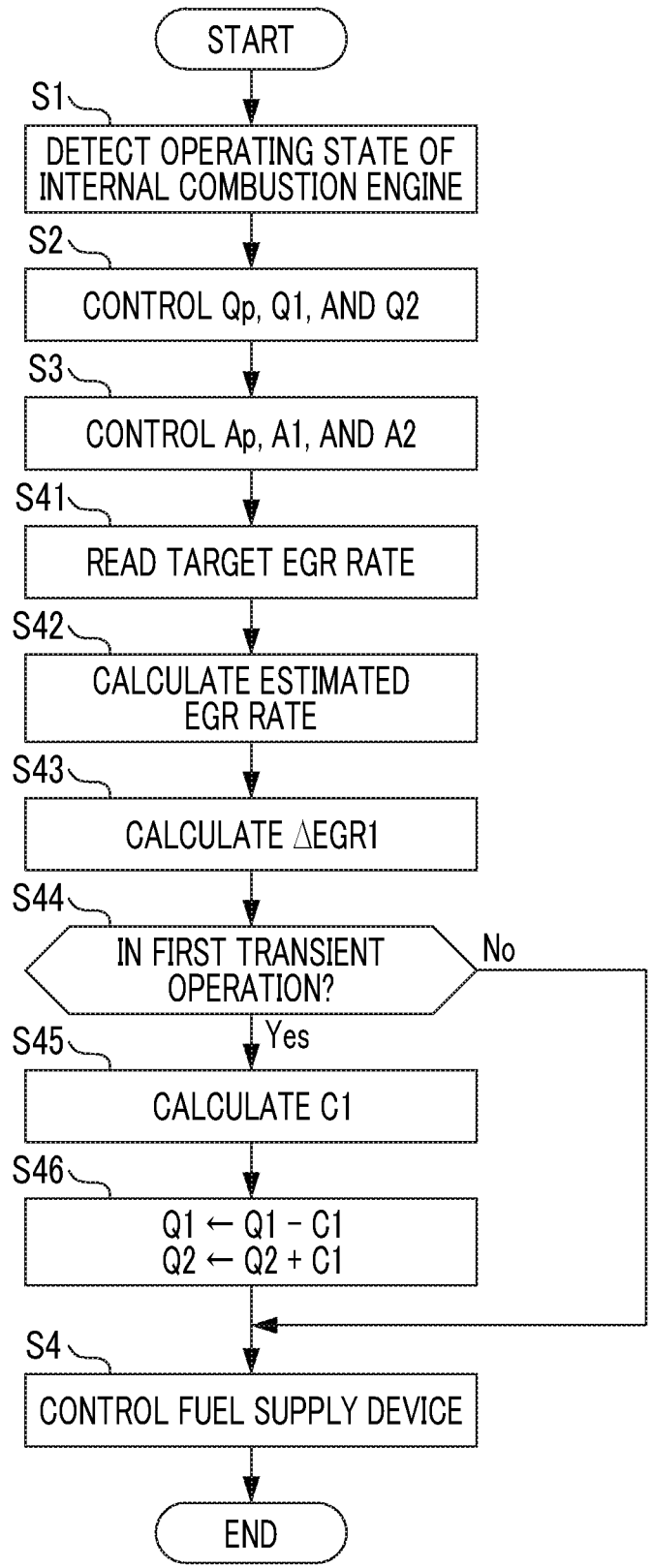
FIG. 21 is a flowchart for describing a fuel injection control according to a fourth embodiment of the present disclosure.
Figure 22:
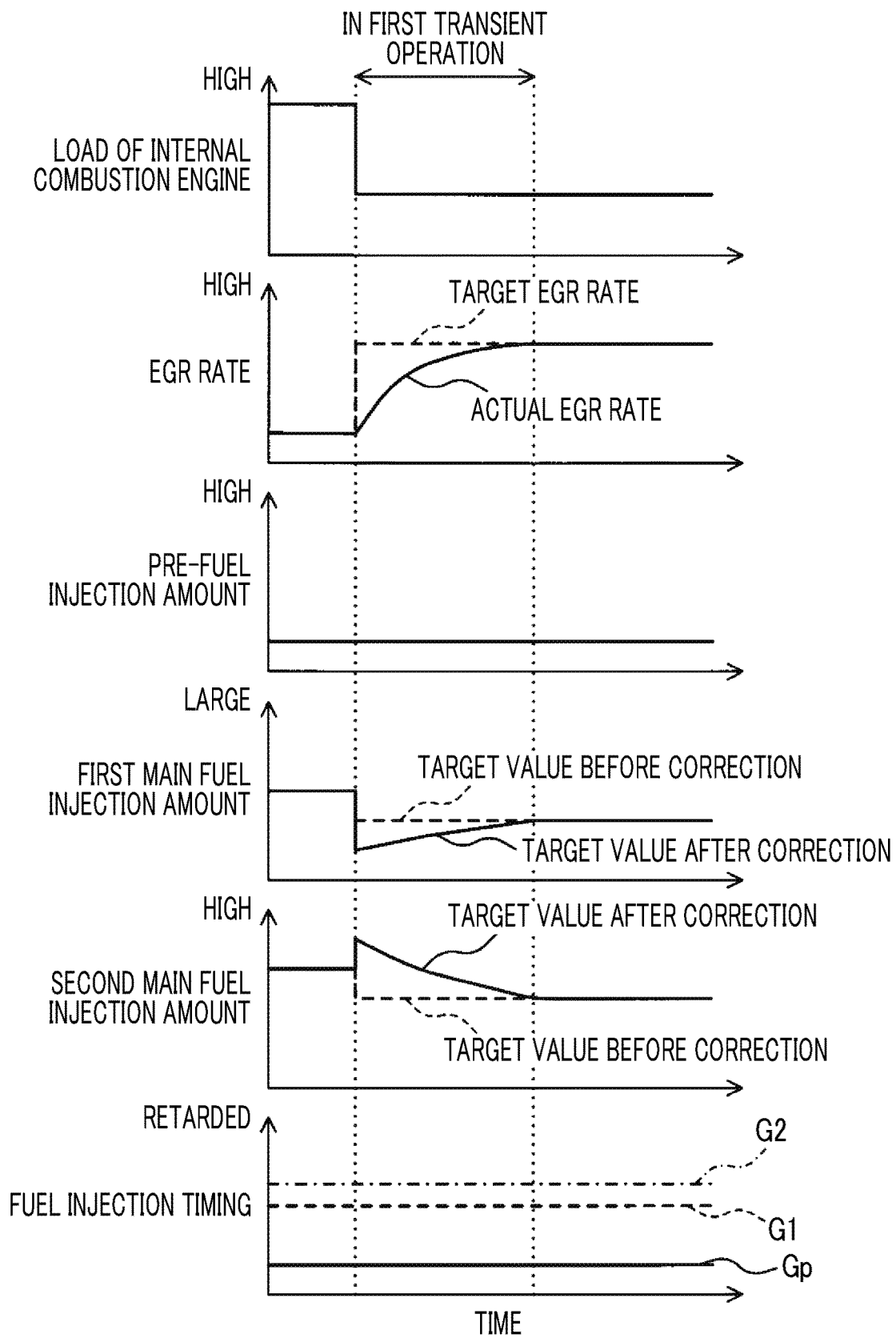
FIG. 22 is a timing chart illustrating operation of the fuel injection control according to the fourth embodiment of the present disclosure.

FIG. 21 is a flowchart for describing the fuel injection control according to the fourth embodiment. FIG. 22 is a timing chart illustrating operation of the fuel injection control according to the fourth embodiment.

Processes performed in steps S1 to S4 are the same as those in the first embodiment and thus, are not described here.

In step S41, the electronic control unit 200 reads the target EGR rate that is calculated by referencing the graph in FIG. 5.

In step S42, the electronic control unit 200 calculates the estimated EGR rate. While a method of estimating the estimated EGR rate, that is, the actual EGR rate, may be appropriately selected from various well-known estimation methods, a predetermined delaying process (for example, a primary delaying process) that considers a response delay corresponding to the length or the like of the intake passage 30 or the EGR passage 32 is performed on the target EGR rate, and the result of the delaying process is used as the estimated EGR rate in the fourth embodiment.

In step S43, the electronic control unit 200 calculates the first difference value $\Delta EGR1$ by subtracting the estimated EGR rate from the target EGR rate.

In step S44, the electronic control unit 200 determines whether or not the internal combustion engine is in the first transient operation. In the fourth embodiment, when the first difference value $\Delta EGR1$ is larger than or equal to a predetermined value, the electronic control unit 200 determines that the internal combustion engine is in the first transient operation, and proceeds to the process of step S45. When the first difference value $\Delta EGR1$ is less than the predetermined value, the electronic control unit 200 determines that the internal combustion engine is not in the first transient operation, and proceeds to the process of step S4.

Figure 23:
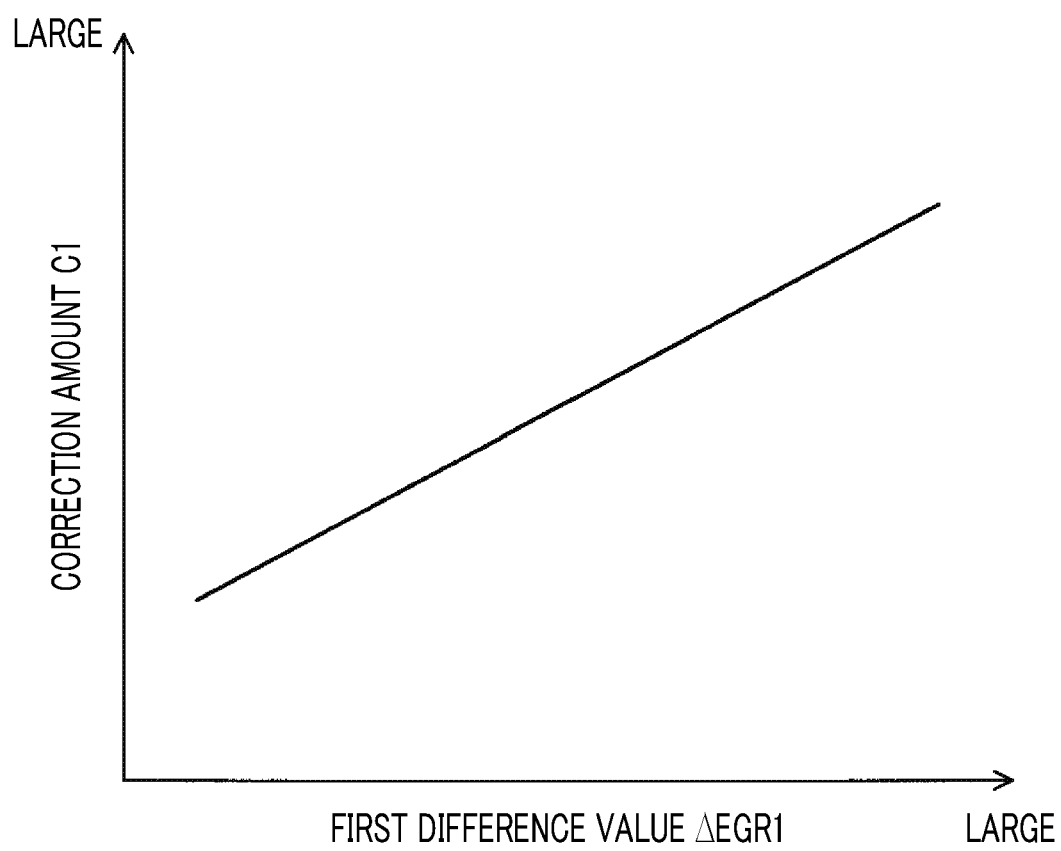
FIG. 23 is a graph according to the fourth embodiment of the present disclosure for calculating a correction amount for the target injection amount of the first main fuel injection in a first transient operation based on a first difference value.

In step S45, the electronic control unit 200 calculates a correction amount C1 for the target injection amount Q1 of the first main fuel injection G1 in the first transient operation. Specifically, the electronic control unit 200 references a graph in FIG. 23 that is produced in advance by experiment and the like, and calculates the correction amount C1 based on the first difference value $\Delta EGR1$. As illustrated in FIG. 23, the correction amount C1 is increased as the first difference value $\Delta EGR1$ is increased.

In step S46, the electronic control unit 200 corrects the target injection amount Q1 of the first main fuel injection G1 and the target injection amount Q2 of the second main fuel injection G2 calculated in step S2. Specifically, the electronic control unit 200 performs correction by subtracting the correction amount C1 from the target injection amount Q1 of the first main fuel injection G1, and performs correction by adding the correction amount C1 to the target injection amount Q2 of the second main fuel injection G2.

According to the fourth embodiment described thus far, the intake device 3 is configured to recirculate exhaust gas emitted from the combustion chamber 11 to the intake passage in the engine main body 1 and change the EGR rate (the recirculation rate of exhaust gas). The electronic control unit 200 is configured to control the intake device 3 such that the EGR rate is decreased as the load of the internal combustion engine is increased. The electronic control unit 200 is configured to correct the injection amount of the first main fuel (primary fuel) and the injection amount of the second main fuel (secondary fuel) based on the first difference value $\Delta EGR1$ that is acquired by subtracting the estimated EGR rate (the actual recirculation rate of exhaust gas) from the target EGR rate (the target recirculation rate of exhaust gas) after a change in load, when the load of the internal combustion engine is changed to a low load side from a high load side.

Specifically, the electronic control unit 200 is configured to correct the injection amount of the first main fuel to decrease the injection amount of the first main fuel, and correct the injection amount of the second main fuel to increase the injection amount of the second main fuel as the first difference value ΔEGR1 is increased.

Accordingly, the amount of heat release at the combustion of the first main fuel can be decreased, and an increase in the first peak value P1 can be sufficiently suppressed. The amount of heat release at the combustion of the second main fuel can be increased, and a decrease in the second peak value P2 can be suppressed. Thus, in the first transient operation, an increase in the amplitude of the actual pressure wave into which the pressure wave generated by the first heat release and the pressure wave generated by the second heat release are combined can be suppressed, and an increase in combustion noise can be suppressed.

Fifth Embodiment

Next, a fifth embodiment of the present disclosure will be described. The fifth embodiment is different from the fourth embodiment in that the target injection timing Ap of the pre-fuel injection Gp and the target injection timing A1 of the first main fuel injection G1 are corrected when the load of the internal combustion engine is changed to a low load side from a high load side. Hereinafter, the difference in the fifth embodiment will be mainly described.

As described in the fourth embodiment, the ignition delay time period τ of each of the pre-fuel and the first main fuel is shortened in the first transient operation. Thus, the first mountain pressure waveform Y1 of the pattern of the pressure increase rate in the combustion chamber is advanced, and the first peak value P1 is increased.

Therefore, in the fifth embodiment, the target injection timing Ap of the pre-fuel injection Gp and the target injection timing A1 of the first main fuel injection G1 are corrected to be retarded based on the first difference value ΔEGR1. Accordingly, even when the ignition delay time period τ of the first main fuel is shortened, an advance in the first mountain pressure waveform Y1 of the pattern of the pressure increase rate in the combustion chamber can be suppressed. Thus, an increase in the first peak value P1 can be suppressed, and a decrease in the second peak value P2 can be sufficiently suppressed. Hereinafter, the fuel injection control according to the fifth embodiment will be described.

Figure 24:
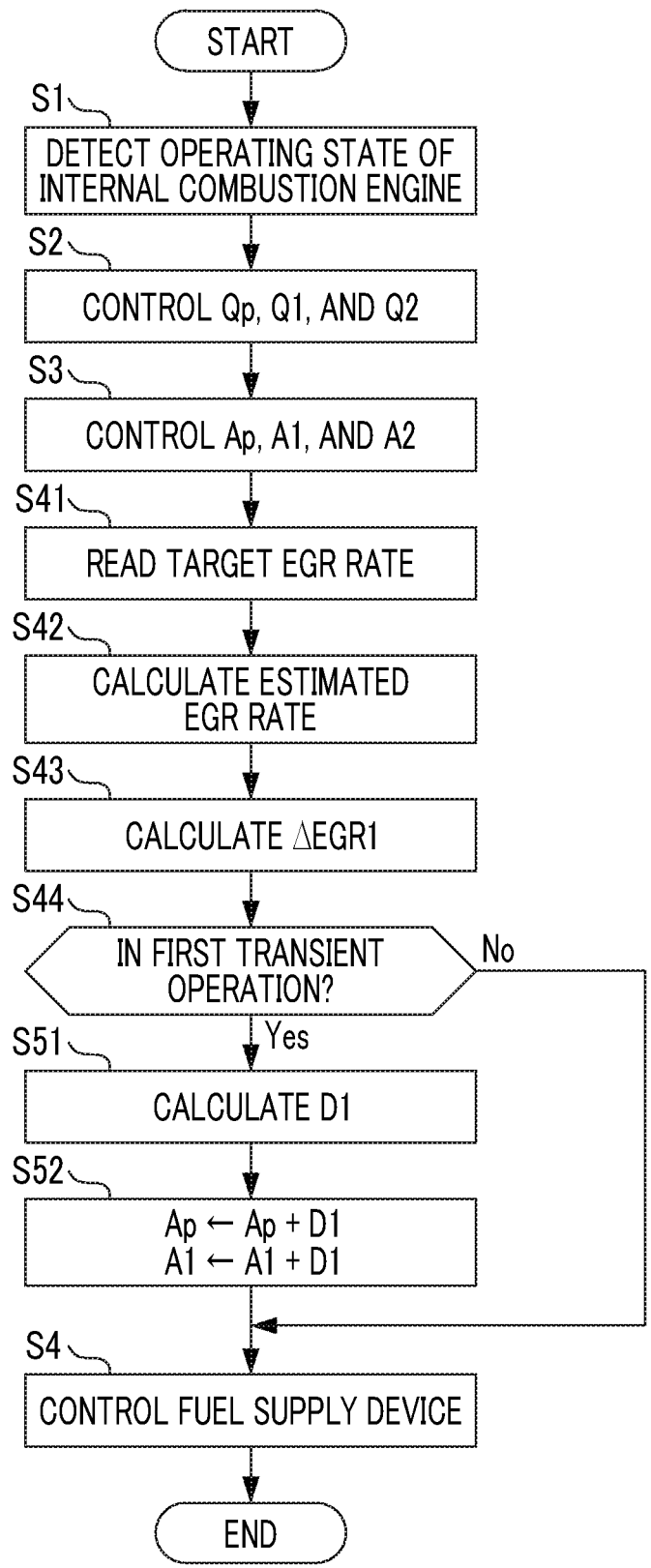
FIG. 24 is a flowchart for describing a fuel injection control according to a fifth embodiment of the present disclosure.
Figure 25:
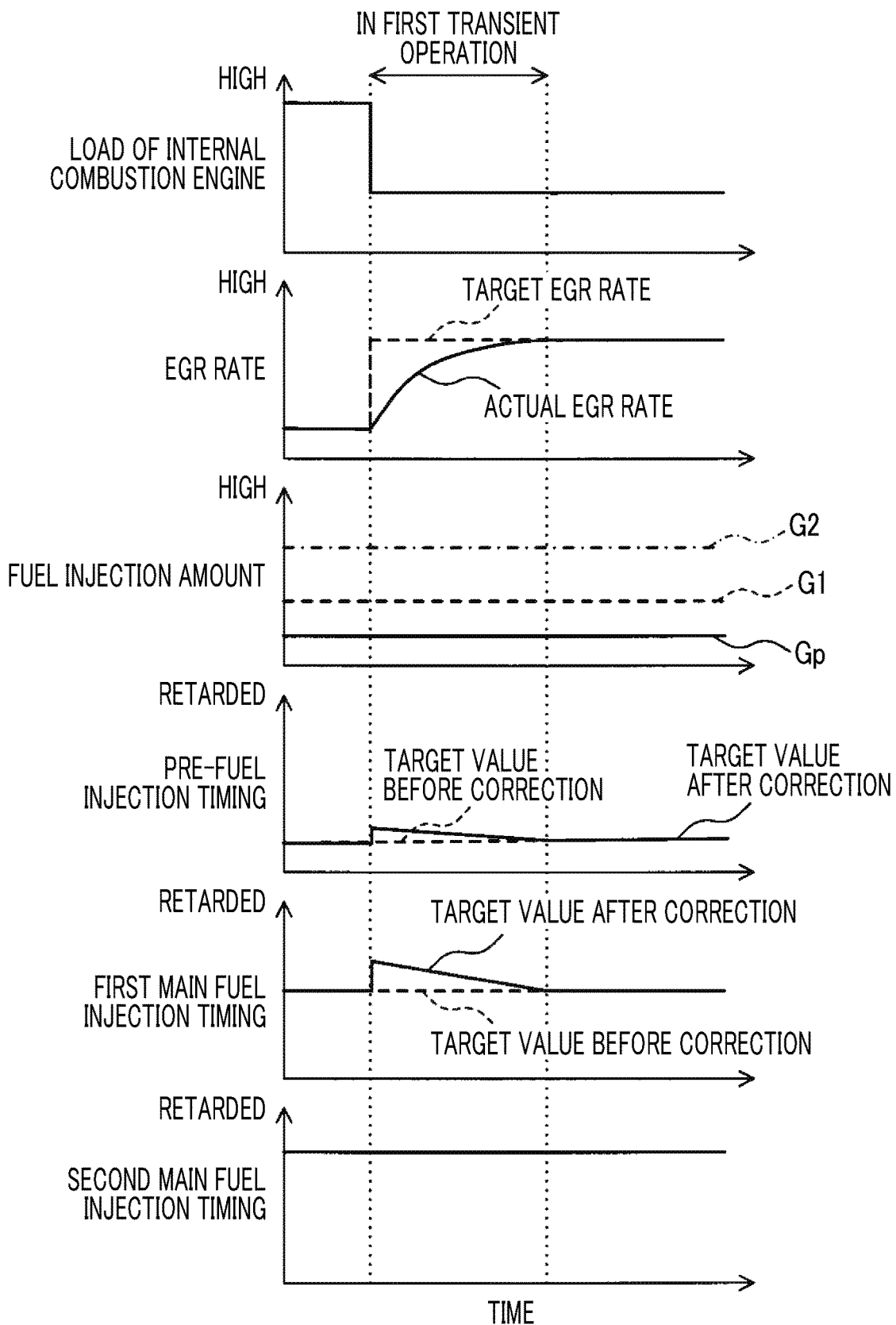
FIG. 25 is a timing chart illustrating operation of the fuel injection control according to the fifth embodiment of the present disclosure.

FIG. 24 is a flowchart for describing the fuel injection control according to the fifth embodiment. FIG. 25 is a timing chart illustrating operation of the fuel injection control according to the fifth embodiment.

Processes performed in steps S1 to S4 are the same as those in the first embodiment, and processes performed in step S41 to step S44 are the same as those in the fourth embodiment. Thus, those processes are not described here.

Figure 26:
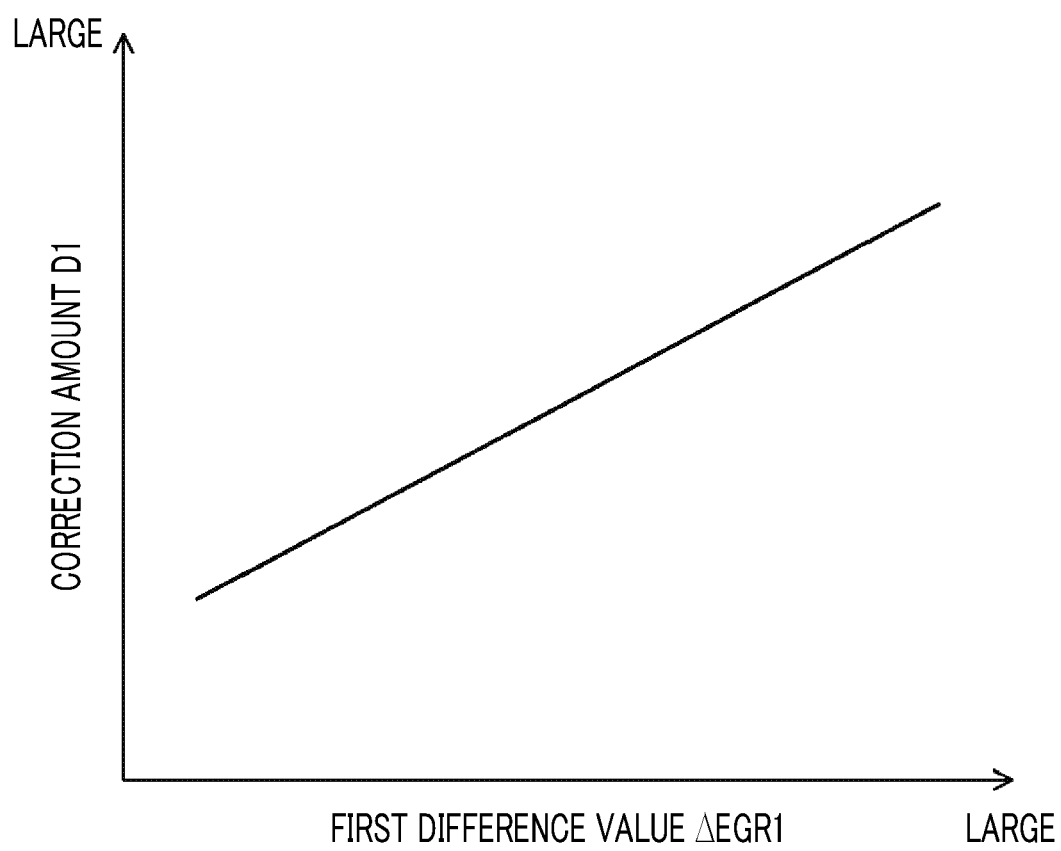
FIG. 26 is a graph according to the fifth embodiment of the present disclosure for calculating a correction amount for a target injection timing of the pre-fuel injection and a target injection timing of the first main fuel injection in the first transient operation based on the first difference value.

In step S51, the electronic control unit 200 calculates a correction amount D1 for the target injection timing Ap of the pre-fuel injection Gp and the target injection timing A1 of the first main fuel injection G1 in the first transient operation. Specifically, the electronic control unit 200 references a graph in FIG. 26 that is produced in advance by experiment and the like, and calculates the correction amount D1 based on the first difference value ΔEGR1. As illustrated in FIG. 26, the correction amount D1 is increased as the first difference value ΔEGR1 is increased.

In step S52, the electronic control unit 200 corrects the target injection timing Ap of the pre-fuel injection Gp and the target injection timing A1 of the first main fuel injection G1 calculated in step S3. Specifically, the electronic control unit 200 performs correction by adding the correction amount D1 to the target injection timing Ap of the pre-fuel injection Gp and the target injection timing A1 of the first main fuel injection G1.

According to the fifth embodiment described thus far, the electronic control unit 200 is configured to correct the injection timing of the first main fuel (primary fuel) based on the first difference value ΔEGR1 that is acquired by subtracting the estimated EGR rate (the actual recirculation rate of exhaust gas) from the target EGR rate (the target recirculation rate of exhaust gas) after a change in load, when the load of the internal combustion engine is changed to a low load side from a high load side.

Specifically, the electronic control unit 200 is configured to retard the injection timing of the first main fuel as the first difference value ΔEGR1 is increased. In the case of performing the pre-fuel injection Gp, the electronic control unit 200 is configured to retard the injection timing of the pre-fuel injection Gp as the first difference value ΔEGR1 is increased.

Accordingly, even when the ignition delay time period τ of the first main fuel is shortened in the first transient operation, an advance in the first mountain pressure waveform Y1 of the pattern of the pressure increase rate in the combustion chamber can be suppressed. Thus, an increase in the first peak value P1 can be suppressed, and a decrease in the second peak value P2 can be sufficiently suppressed. Thus, in the first transient operation, an increase in the amplitude of the actual pressure wave into which the pressure wave generated by the first heat release and the pressure wave generated by the second heat release are combined is suppressed, and an increase in combustion noise can be suppressed.

By retarding the injection timing of the pre-fuel injection Gp as well, the first heat release is slowly started, and an increase in combustion noise due to a rapid start of heat release can be suppressed.

In the case of performing correction by retarding the injection timing of each of the pre-fuel and the first main fuel as in the fifth embodiment, when the injection timing of each of the pre-fuel and the first main fuel is excessively retarded, the interval between the self-ignition timing of each of the pre-fuel and the first main fuel and the self-ignition timing of the second main fuel is shortened, and there is a possibility that heat release may not be caused twice in a stepwise manner. Thus, when an increase in the first peak value P1 and a decrease in the second peak value P2 cannot be sufficiently suppressed even by retarding the injection timing of each of the pre-fuel and the first main fuel to the maximum, the correction of the target injection amount Q1 of the first main fuel injection G1 and the target injection amount Q2 of the second main fuel injection G2 as in the fourth embodiment may be performed along with the correction of the injection timing of each of the pre-fuel and the first main fuel.

Sixth Embodiment

Next, a sixth embodiment of the present disclosure will be described. The sixth embodiment is different from the fourth embodiment in that the target injection amount Q1 of the first main fuel injection G1 and the target injection amount Q2 of the second main fuel injection G2 are corrected even when the load of the internal combustion engine is changed to a high load side from a low load side. Hereinafter, the difference in the sixth embodiment will be mainly described.

In the fourth embodiment, the target injection amount Q1 of the first main fuel injection G1 and the target injection amount Q2 of the second main fuel injection G2 are corrected in the first transient operation where the load of the internal combustion engine is changed to a low load side from a high load side.

In the case of decreasing the target EGR rate as the load of the internal combustion engine is increased, when the load of the internal combustion engine is conversely changed to a high load side from a low load side, the target EGR rate is changed to a low value from a high value. Thus, when the load of the internal combustion engine is changed to a high load side from a low load side, the actual EGR rate transiently becomes higher than the target EGR rate after the change in load.

Accordingly, when the actual EGR rate becomes higher than the target EGR rate, the residual gas proportion RES becomes higher than a target proportion, and the ignition delay time period $\tau$ of each of the pre-fuel and the first main fuel is lengthened. Thus, the self-ignition timing of each of the pre-fuel and the first main fuel is retarded. Accordingly, the interval between the self-ignition timing of each of the pre-fuel and the first main fuel and the self-ignition timing of the second main fuel is shortened. Thus, heat release may not be caused twice in a stepwise manner, and there is a possibility that heat release is caused once.

Consequently, in a transient operation (hereinafter, referred to as "second transient operation") where the load of the internal combustion engine is changed to a high load side from a low load side, the shape of the pressure waveform of the pattern of the pressure increase rate in the combustion chamber has one mountain, and the effect of reducing combustion noise is not achieved. Thus, there is a possibility of an increase in combustion noise.

Therefore, in the sixth embodiment, in order to suppress retardation of the self-ignition timing of the first main fuel in the second transient operation, the target injection amount Q1 of the first main fuel injection G1 and the target injection amount Q2 of the second main fuel injection G2 are corrected in the second transient operation based on a second difference value $\Delta$EGR2 that is acquired by subtracting the target EGR rate from the estimated EGR rate.

Specifically, when the second difference value $\Delta$EGR2 is large, that is, as the actual EGR rate becomes higher than the target EGR rate after the change in load, the ignition delay time period $\tau$ of the first main fuel tends to be lengthened. Thus, the target injection amount Q1 of the first main fuel injection G1 is corrected to be increased. The target injection amount Q2 of the second main fuel injection G2 is corrected to be decreased by the amount corresponding to the increase in the target injection amount Q1 of the first main fuel injection G1.

As described above, the ignition delay time period $\tau$ of the first main fuel that is used for causing the premix charged compressive ignition tends to be shortened as the equivalence ratio $\phi$ is increased. Thus, by correcting the target injection amount Q1 of the first main fuel injection G1 to be increased as the second difference value $\Delta$EGR2 is increased, retardation of the self-ignition timing of the first main fuel can be suppressed. Hereinafter, the fuel injection control according to the sixth embodiment will be described.

Figure 27:
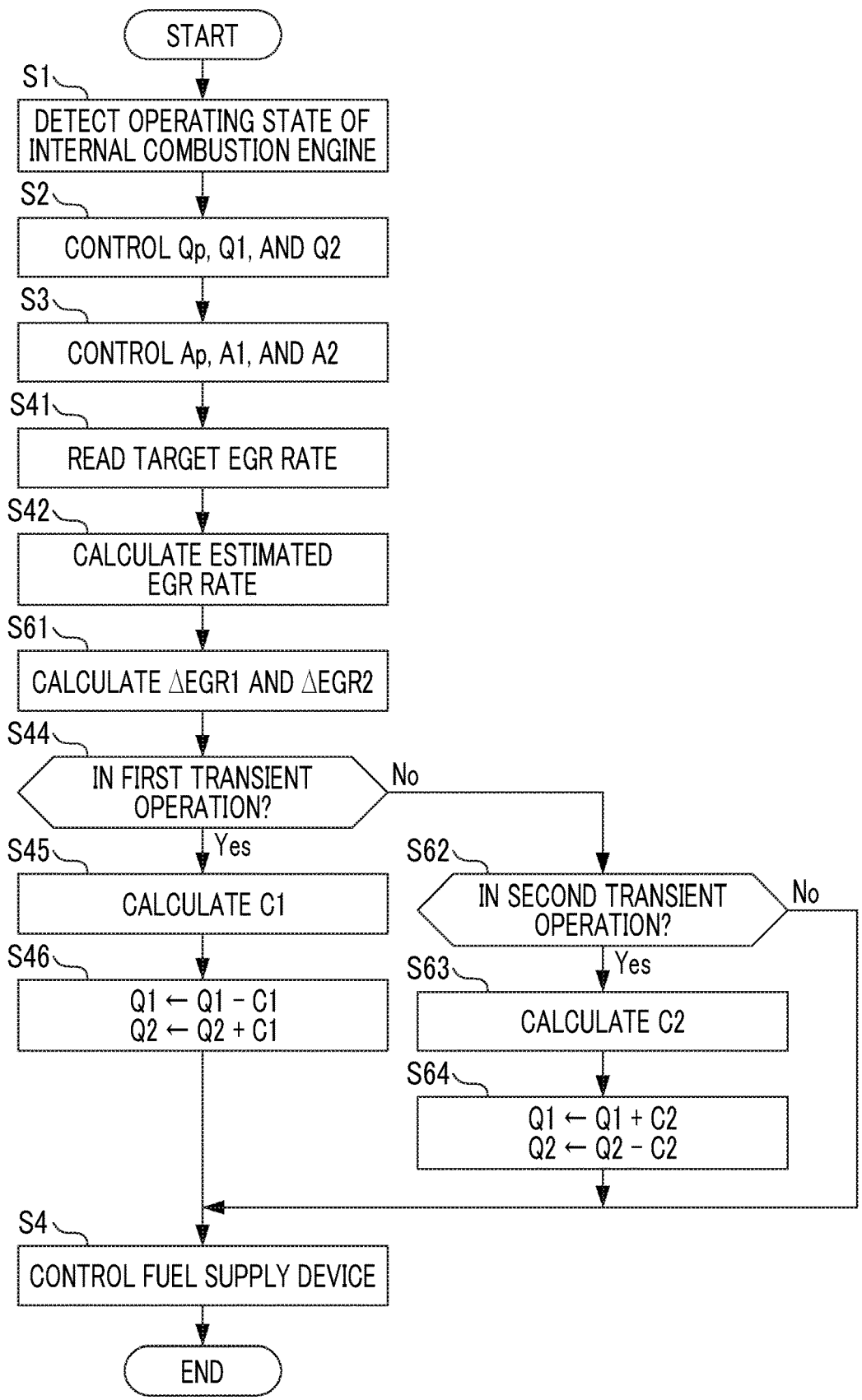
FIG. 27 is a flowchart for describing a fuel injection control according to a sixth embodiment of the present disclosure.
Figure 28:
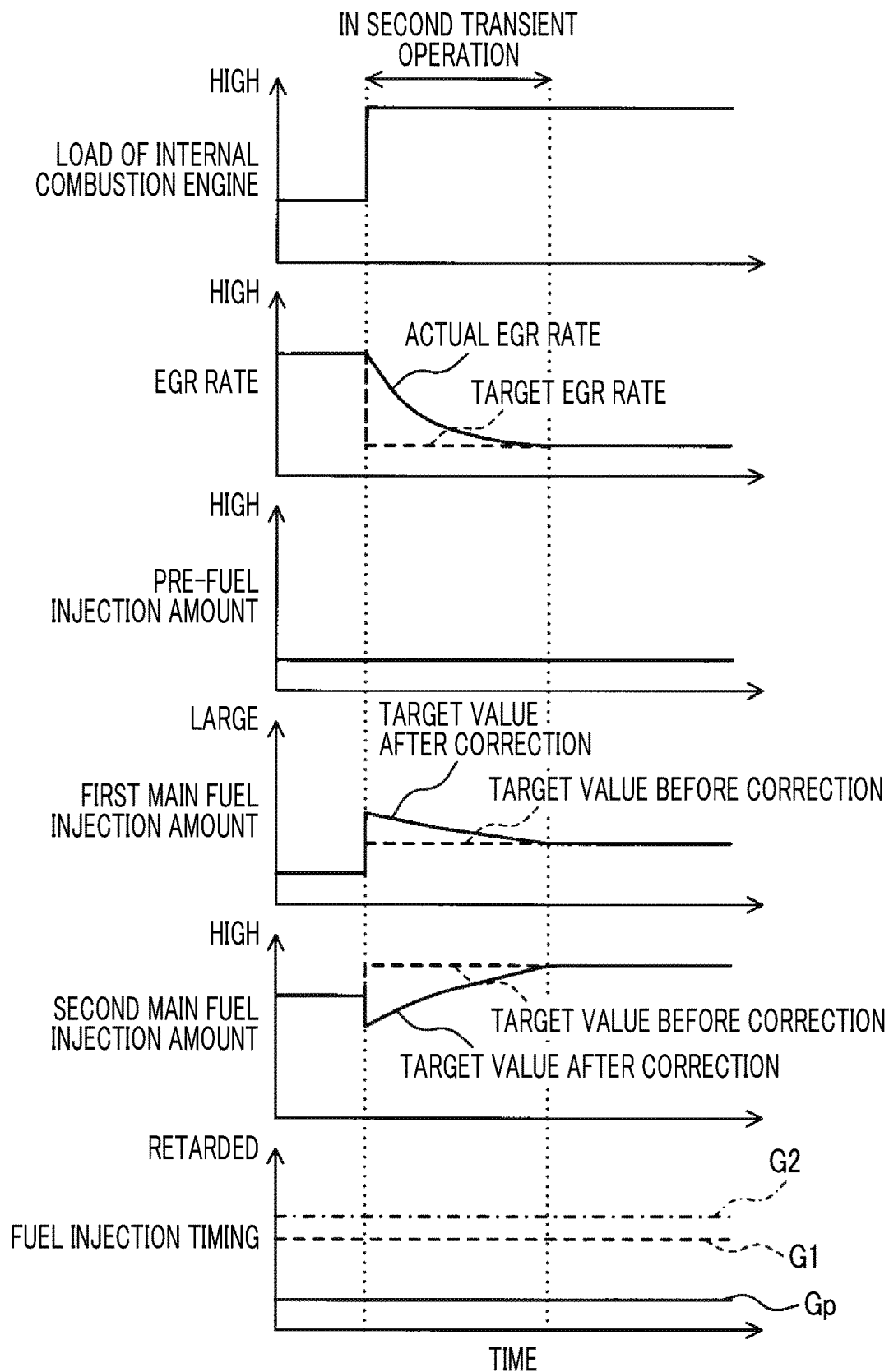
FIG. 28 is a timing chart illustrating operation of the fuel injection control according to the sixth embodiment of the present disclosure.

FIG. 27 is a flowchart for describing the fuel injection control according to the sixth embodiment. FIG. 28 is a timing chart illustrating operation of the fuel injection control according to the sixth embodiment, and particularly is a timing chart illustrating operation of the fuel injection control in the second transient operation.

In FIG. 27, processes performed in steps S1 to S4 are the same as those in the first embodiment, and processes performed in steps S41, S42, S44 to S46 are the same as those in the fourth embodiment. Thus, those processes are not described here.

In step S61, the electronic control unit 200 calculates the first difference value $\Delta$EGR1 by subtracting the estimated EGR rate from the target EGR rate, and calculates the second difference value $\Delta$EGR2 by subtracting the target EGR rate from the estimated EGR rate.

In step S62, the electronic control unit 200 determines whether or not the internal combustion engine is in the second transient operation. In the sixth embodiment, when the second difference value $\Delta$EGR2 is larger than or equal to a predetermined value, the electronic control unit 200 determines that the internal combustion engine is in the second transient operation, and proceeds to the process of step S63. When the second difference value $\Delta$EGR2 is less than the predetermined value, the electronic control unit 200 determines that the internal combustion engine is not in the second transient operation, and proceeds to the process of step S4.

Figure 29:
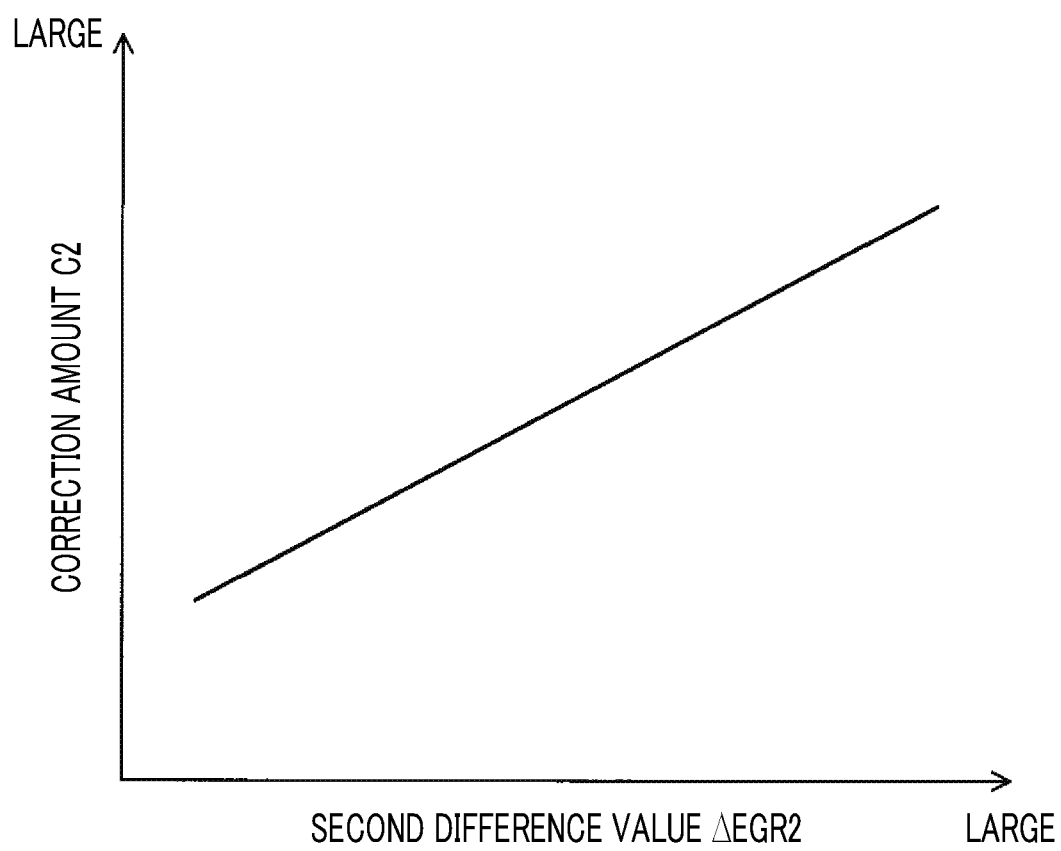
FIG. 29 is a graph according to the sixth embodiment of the present disclosure for calculating a correction amount for the target injection amount of the first main fuel injection and the target injection amount of the second main fuel injection in a second transient operation based on a second difference value.

In step S63, the electronic control unit 200 calculates a correction amount C2 for the target injection amount Q1 of the first main fuel injection G1 and the target injection amount Q2 of the second main fuel injection G2 in the second transient operation. Specifically, the electronic control unit 200 references a graph in FIG. 29 that is produced in advance by experiment and the like, and calculates the correction amount C2 based on the second difference value $\Delta$EGR2. As illustrated in FIG. 29, the correction amount C2 is increased as the second difference value $\Delta$EGR2 is increased.

In step S64, the electronic control unit 200 corrects the target injection amount Q1 of the first main fuel injection G1 and the target injection amount Q2 of the second main fuel injection G2 calculated in step S2. Specifically, the electronic control unit 200 performs correction by adding the correction amount C2 to the target injection amount Q1 of the first main fuel injection G1, and performs correction by subtracting the correction amount C2 from the target injection amount Q2 of the second main fuel injection G2.

According to the sixth embodiment described thus far, the electronic control unit 200 is configured to correct the injection amount of each of the first main fuel (primary fuel) and the second main fuel (secondary fuel) based on the second difference value $\Delta$EGR2 that is acquired by subtracting the target EGR rate (the target recirculation rate of exhaust gas) after a change in load from the estimated EGR rate (the actual recirculation rate of exhaust gas), when the load of the internal combustion engine is changed to a high load side from a low load side.

Specifically, as the second difference value $\Delta$EGR2 is increased, the electronic control unit is configured to correct the injection amount of the first main fuel to increase the injection amount of the first main fuel, and correct the injection amount of the second main fuel to decrease the injection amount of the second main fuel.

Accordingly, by correcting the injection amount of the first main fuel injection G1 to be increased as the second difference value $\Delta$EGR2 is increased, retardation of the self-ignition timing of the first main fuel is suppressed, and a situation where the interval between the self-ignition timing of the first main fuel and the self-ignition timing of the second main fuel is shortened can be suppressed. Thus, since a situation where the shape of the pressure waveform of the pattern of the pressure increase rate in the combustion chamber has one mountain can be suppressed, an increase in combustion noise can be suppressed.

Seventh Embodiment

Next, a seventh embodiment of the present disclosure will be described. The seventh embodiment is different from the sixth embodiment in that the target injection timing Ap of the pre-fuel injection Gp and the target injection timing A1 of the first main fuel injection G1 are corrected when the load of the internal combustion engine is changed to a high load side from a low load side. Hereinafter, the difference in the seventh embodiment will be mainly described.

In the sixth embodiment, the target injection amount Q1 of the first main fuel injection G1 is corrected to be increased in the second transient operation. Thus, retardation of the self-ignition timing of the first main fuel is suppressed, and a situation where the interval between the self-ignition timing of each of the pre-fuel and the first main fuel and the self-ignition timing of the second main fuel is shortened is suppressed.

Meanwhile, in the seventh embodiment, correction is performed in the second transient operation by advancing the target injection timing Ap of the pre-fuel injection Gp and the target injection timing A1 of the first main fuel injection G1 based on the second difference value $\Delta EGR2$. Thus, retardation of the self-ignition timing of the first main fuel is suppressed, and a situation where the interval between the self-ignition timing of each of the pre-fuel and the first main fuel and the self-ignition timing of the second main fuel is shortened is suppressed. Hereinafter, the fuel injection control according to the seventh embodiment will be described.

Figure 30:
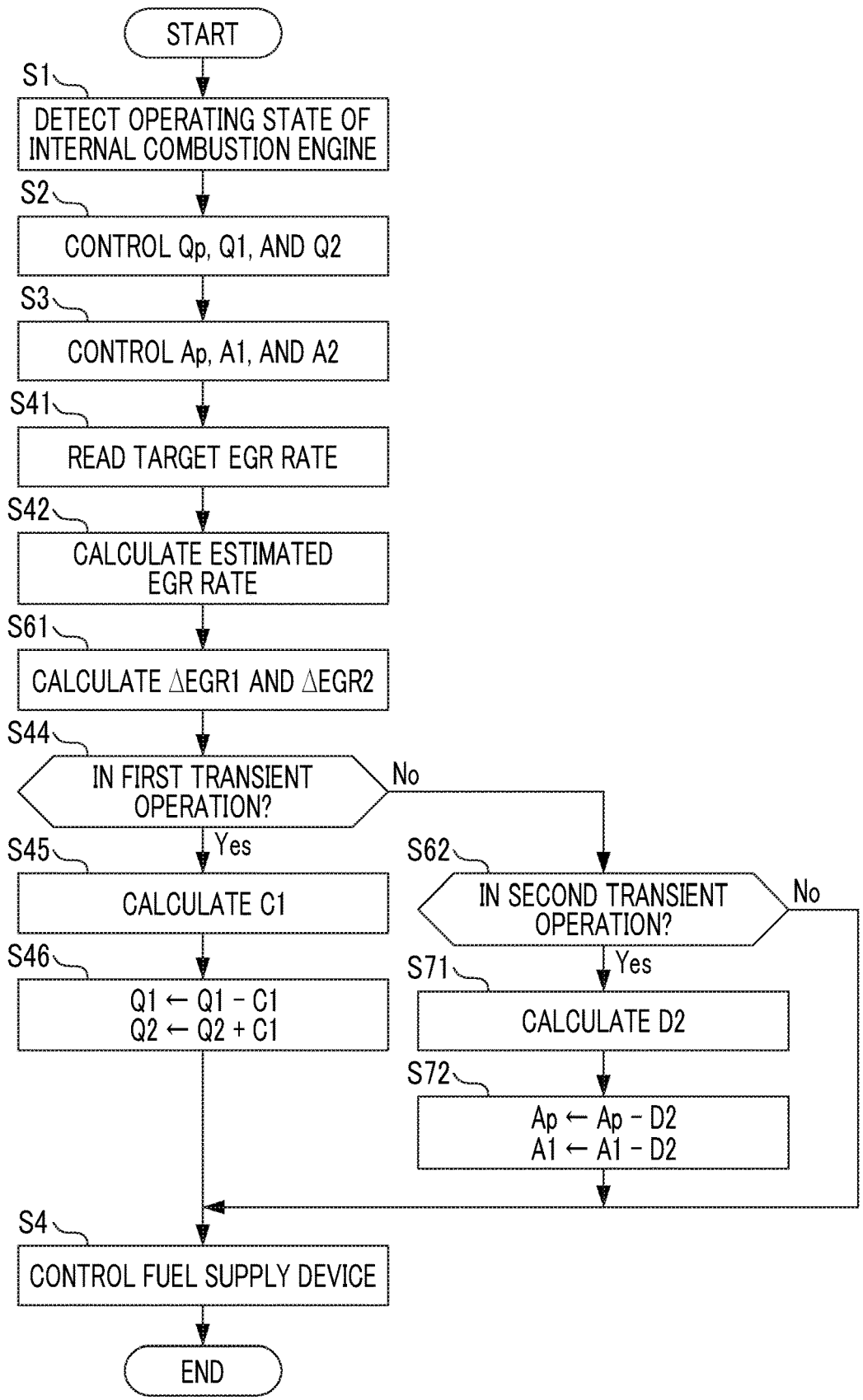
FIG. 30 is a flowchart for describing a fuel injection control according to a seventh embodiment of the present disclosure.
Figure 31:
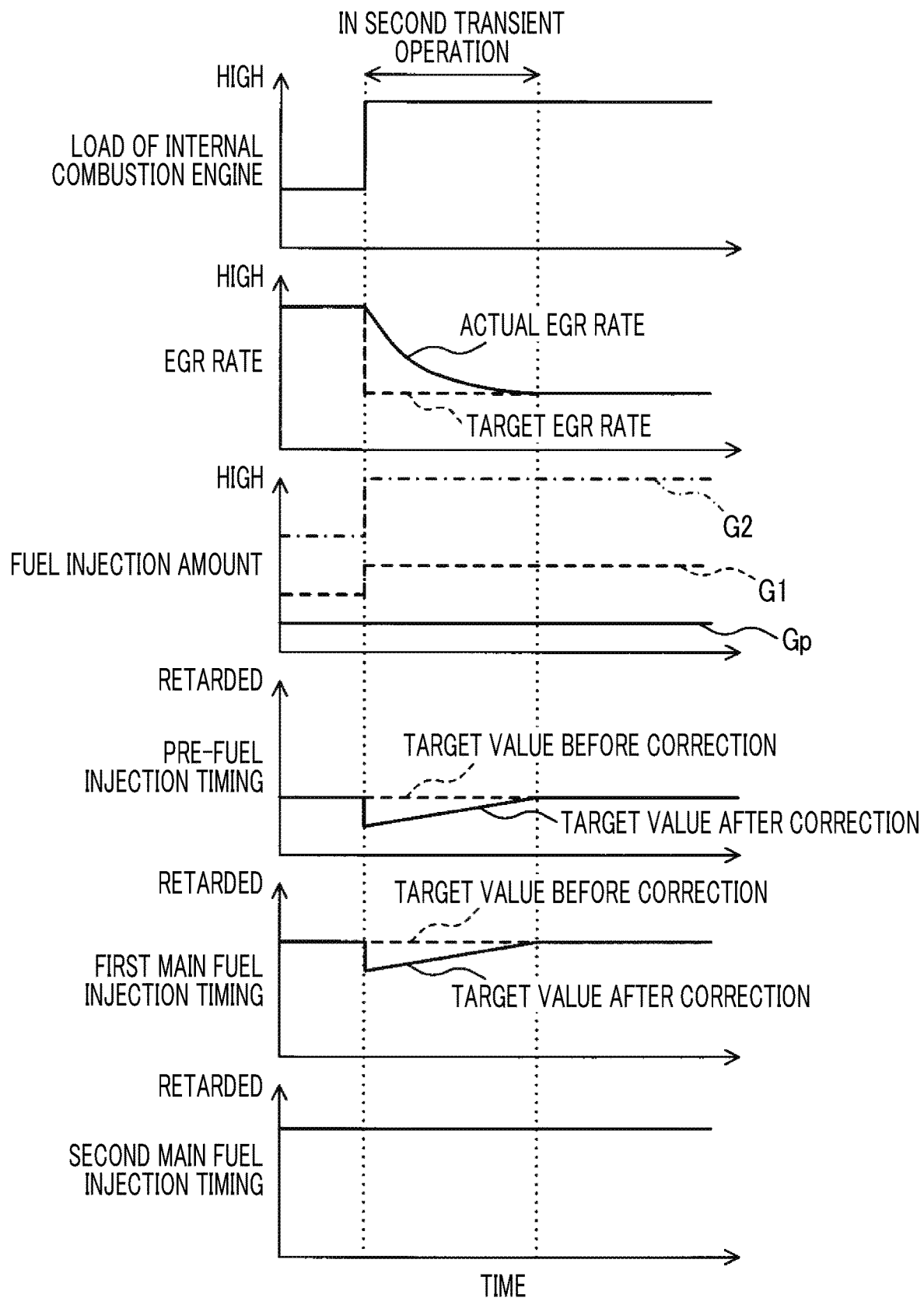
FIG. 31 is a timing chart illustrating operation of the fuel injection control according to the seventh embodiment of the present disclosure.

FIG. 30 is a flowchart for describing the fuel injection control according to the seventh embodiment. FIG. 31 is a timing chart illustrating operation of the fuel injection control according to the seventh embodiment, and particularly is a timing chart illustrating operation of the fuel injection control in the second transient operation.

In FIG. 30, processes performed in steps S1 to S4 are the same as those in the first embodiment, and processes performed in steps S41, S42, S44 to S46 are the same as those in the fourth embodiment. Processes performed in steps S61, S62 are the same as those in the sixth embodiment. Thus, those processes are not described here.

Figure 32:
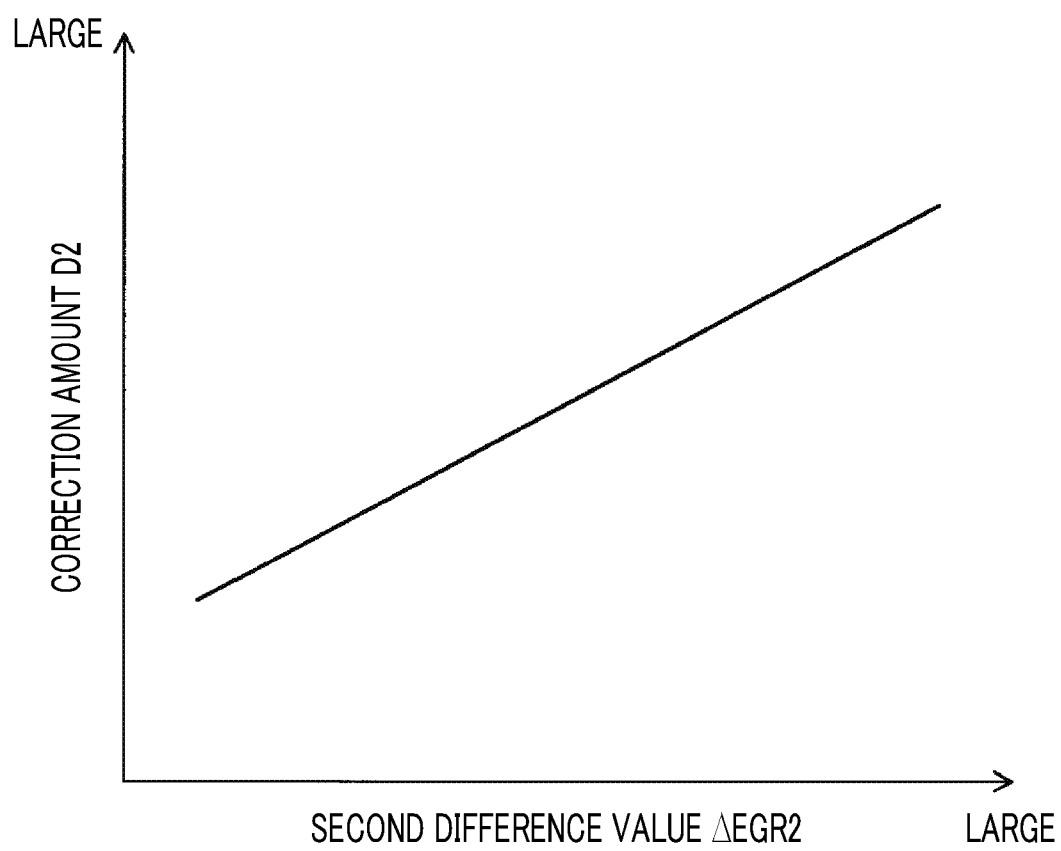
FIG. 32 is a graph according to the seventh embodiment of the present disclosure for calculating a correction amount for the target injection timing of the pre-fuel injection and the target injection timing of the first main fuel injection in the second transient operation based on the second difference value.

In step S71, the electronic control unit 200 calculates a correction amount D2 for the target injection timing Ap of the pre-fuel injection Gp and the target injection timing A1 of the first main fuel injection G1 in the second transient operation. Specifically, the electronic control unit 200 references a graph in FIG. 32 that is produced in advance by experiment and the like, and calculates the correction amount D2 based on the second difference value $\Delta EGR2$. As illustrated in FIG. 32, the correction amount D2 is increased as the second difference value $\Delta EGR2$ is increased.

In step S72, the electronic control unit 200 corrects the target injection timing Ap of the pre-fuel injection Gp and the target injection timing A1 of the first main fuel injection G1 calculated in step S3. Specifically, the electronic control unit 200 performs correction by subtracting the correction amount D2 from the target injection timing Ap of the pre-fuel injection Gp and the target injection timing A1 of the first main fuel injection G1.

According to the seventh embodiment described thus far, the electronic control unit 200 is configured to correct the injection timing of the first main fuel based on the second difference value $\Delta EGR2$ that is acquired by subtracting the target EGR rate (the target recirculation rate of exhaust gas) after a change in load from the estimated EGR rate (the actual recirculation rate of exhaust gas), when the load of the internal combustion engine is changed to a high load side from a low load side.

Specifically, the electronic control unit 200 is configured to advance the injection timing of the first main fuel as the second difference value $\Delta EGR2$ is increased. In the case of performing the pre-fuel injection Gp, the electronic control unit 200 is configured to advance the injection timing of the pre-fuel as the second difference value $\Delta EGR2$ is increased.

Accordingly, retardation of the self-ignition timing of the first main fuel is suppressed, and a situation where the interval between the self-ignition timing of the first main fuel and the self-ignition timing of the second main fuel is shortened can be suppressed. Thus, since a situation where the shape of the pressure waveform of the pattern of the pressure increase rate in the combustion chamber has one mountain can be suppressed, an increase in combustion noise can be suppressed.

While embodiments of the present disclosure are described thus far, the embodiments are merely a part of application examples of the present disclosure, and the technical scope of the present disclosure is not limited to the specific configurations of the embodiments.

What is claimed is:

1. A control device for an internal combustion engine including an engine main body, a fuel injection valve configured to inject fuel into a combustion chamber in the engine main body, and an intake device configured to change oxygen density in the combustion chamber, the control device comprising an electronic control unit configured to control the fuel injection valve to inject at least primary fuel and secondary fuel in this order and cause heat release twice in a stepwise manner in the combustion chamber such that a pattern of a pressure increase rate in the combustion chamber includes a first peak and a second peak occurring after the first peak, control an injection timing and an injection amount of each of the primary fuel and the secondary fuel such that a second peak value that is a peak value of the pressure increase rate at the second peak becomes higher than a first peak value that is a peak value of the pressure increase rate at the first peak, control the intake device such that the oxygen density in the combustion chamber is increased along with an increase in a load of the internal combustion engine, and control the injection timing and the injection amount of each of the primary fuel and the secondary fuel such that a peak difference that is acquired by subtracting the first peak value from the second peak value is increased as the load of the internal combustion engine is increased.

2. The control device according to claim 1, wherein the electronic control unit is configured to control the injection amount of the secondary fuel to become larger than the injection amount of the primary fuel, and control the injection amount of each of the primary fuel and the secondary fuel such that an injection amount ratio that is acquired by dividing the injection amount of the secondary fuel by the injection amount of the primary fuel is increased as the load of the internal combustion engine is increased.

3. The control device according to claim 1, wherein:

the electronic control unit is configured to inject pre-fuel before the injection of the primary fuel; and the electronic control unit is configured to control an injection amount of the pre-fuel to be increased such that a crank interval from a crank angle at which the pattern of the pressure increase rate in the combustion chamber has the first peak value, to a crank angle at which the pattern of the pressure increase rate in the combustion chamber has the second peak value is increased as a rotational speed of the internal combustion engine is increased.

4. The control device according to claim 1, wherein the electronic control unit is configured to control the injection timing of the secondary fuel to be retarded and control the injection amount of the secondary fuel to be increased such that a crank interval from a crank angle at which the pattern of the pressure increase rate in the combustion chamber has the first peak value, to a crank angle at which the pattern of the pressure increase rate in the combustion chamber has the second peak value is increased as a rotational speed of the internal combustion engine is increased.

5. The control device according to claim 1, wherein:
the intake device is configured to recirculate exhaust gas emitted from the combustion chamber to an intake passage in the engine main body and change a recirculation rate of the exhaust gas;
the electronic control unit is configured to control the intake device such that the recirculation rate of the exhaust gas is decreased as the load of the internal combustion engine is increased; and
the electronic control unit is configured to correct the injection amount of each of the primary fuel and the secondary fuel based on a first difference value that is acquired by subtracting an actual recirculation rate of the exhaust gas from a target recirculation rate of the exhaust gas after a change in load, when the load of the internal combustion engine is changed to a low load side from a high load side.

6. The control device according to claim 5, wherein the electronic control unit is configured to
correct the injection amount of the primary fuel such that the injection amount of the primary fuel is decreased, and
correct the injection amount of the secondary fuel such that the injection amount of the secondary fuel is increased as the first difference value is increased.

7. The control device according to claim 1, wherein:
the intake device is configured to recirculate exhaust gas emitted from the combustion chamber to an intake passage in the engine main body and change a recirculation rate of the exhaust gas;
the electronic control unit is configured to control the intake device such that the recirculation rate of the exhaust gas is decreased as the load of the internal combustion engine is increased; and
the electronic control unit is configured to correct the injection timing of the primary fuel based on a first difference value that is acquired by subtracting an actual recirculation rate of the exhaust gas from a target recirculation rate of the exhaust gas after a change in load, when the load of the internal combustion engine is changed to a low load side from a high load side.

8. The control device according to claim 7, wherein the electronic control unit is configured to retard the injection timing of the primary fuel as the first difference value is increased.

9. The control device according to claim 8, wherein the electronic control unit is configured to
inject pre-fuel before the injection of the primary fuel, and
retard an injection timing of the pre-fuel as the first difference value is increased.

10. The control device according to claim 5, wherein the electronic control unit is configured to correct the injection amount of each of the primary fuel and the secondary fuel based on a second difference value that is acquired by subtracting the target recirculation rate of the exhaust gas after a change in load from the actual recirculation rate of the exhaust gas, when the load of the internal combustion engine is changed to a high load side from a low load side.

11. The control device according to claim 10, wherein the electronic control unit is configured to, as the second difference value is increased, correct the injection amount of the primary fuel to increase the injection amount of the primary fuel, and correct the injection amount of the secondary fuel to decrease the injection amount of the secondary fuel.

12. The control device according to claim 5, wherein the electronic control unit is configured to correct the injection timing of the primary fuel based on a second difference value that is acquired by subtracting the target recirculation rate of the exhaust gas after a change in load from the actual recirculation rate of the exhaust gas, when the load of the internal combustion engine is changed to a high load side from a low load side.

13. The control device according to claim 12, wherein the electronic control unit is configured to advance the injection timing of the primary fuel as the second difference value is increased.

14. The control device according to claim 13, wherein the electronic control unit is configured to
inject pre-fuel before the injection of the primary fuel, and
advance an injection timing of the pre-fuel as the second difference value is increased.

* * * * *